US012605896B2

(12) United States Patent
McAllister

(10) Patent No.: US 12,605,896 B2
(45) Date of Patent: Apr. 21, 2026

(54) ADDITIVE MANUFACTURING PLATFORM, RESIN, AND IMPROVEMENTS FOR MICRODEVICE FABRICATION

(71) Applicant: Skyphos Industries Inc., Roanoke, VA (US)

(72) Inventor: Walter McAllister, Blacksburg, VA (US)

(73) Assignee: Skyphos Industries Inc., Blacksburg, VA (US)

( * ) Notice: Subject to any disclaimer, the term of this patent is extended or adjusted under 35 U.S.C. 154(b) by 87 days.

(21) Appl. No.: 17/943,177

(22) Filed: Sep. 12, 2022

(65) Prior Publication Data

US 2023/0107540 A1     Apr. 6, 2023

Related U.S. Application Data

(63) Continuation-in-part of application No. 17/277,540, filed as application No. PCT/US2019/051797 on Sep. 18, 2019, now Pat. No. 11,442,345.

(Continued)

(51) Int. Cl.
*B29C 64/286* (2017.01)
*B01L 3/00* (2006.01)
(Continued)

(52) U.S. Cl.
CPC ...... *B29C 64/286* (2017.08); *B01L 3/502707* (2013.01); *B29C 64/129* (2017.08); *B29C 64/232* (2017.08); *B29C 64/245* (2017.08); *B29C 64/393* (2017.08); *B33Y 10/00* (2014.12); *B33Y 30/00* (2014.12); *B33Y 50/02* (2014.12); *B33Y 80/00* (2014.12);
(Continued)

(58) Field of Classification Search
CPC ... B29C 64/129; B29C 64/286; B29C 64/245; B29C 64/255; B29C 64/232; B29C 64/393; B01L 3/502707; B01L 2200/12; B01L 2300/0654; B29L 2031/756; B33Y 10/00; B33Y 30/00; B33Y 50/02; B33Y 80/00; B33Y 70/00
See application file for complete search history.

(56) References Cited

U.S. PATENT DOCUMENTS 4,688,087 A * 8/1987 Ams ...................... H04N 23/55
348/69
9,701,775 B2 7/2017 Liu et al.
(Continued)

FOREIGN PATENT DOCUMENTS

CN       101162358 A     4/2008
CN       103716570 B     9/2016
(Continued)

OTHER PUBLICATIONS

Application No. PCT/US2023/032542, International Search Report and Written Opinion dated Jan. 17, 2024.
(Continued)

*Primary Examiner* — Nahida Sultana
(74) *Attorney, Agent, or Firm* — Woods Rogers Vandeventer Black PLC; Nathan A. Evans

(57) ABSTRACT

A 3D printing platform allowing for 3D printing of microdevices for applications in microfluidics, using light filtering elements to control aspects of the curing and 3D printing processes.

13 Claims, 28 Drawing Sheets

Related U.S. Application Data

(60) Provisional application No. 62/732,841, filed on Sep. 18, 2018.

(51) Int. Cl.

| | |
|---|---|
| B29C 64/129 | (2017.01) |
| B29C 64/232 | (2017.01) |
| B29C 64/245 | (2017.01) |
| B29C 64/393 | (2017.01) |
| B33Y 10/00 | (2015.01) |
| B33Y 30/00 | (2015.01) |
| B33Y 50/02 | (2015.01) |
| B33Y 80/00 | (2015.01) |
| B29L 31/00 | (2006.01) |

(52) U.S. Cl.
CPC ... *B01L 2200/12* (2013.01); *B01L 2300/0654* (2013.01); *B29L 2031/756* (2013.01)

(56) References Cited

U.S. PATENT DOCUMENTS

| | | | |
|---|---|---|---|
| 10,597,289 B1 | 3/2020 | Woolley et al. | |
| 11,560,305 B1 | 1/2023 | Nordin et al. | |
| 2003/0169511 A1 | 9/2003 | Liu et al. | |
| 2006/0146298 A1 | 7/2006 | Lin | |
| 2006/0198918 A1 | 9/2006 | Koyagi et al. | |
| 2007/0103432 A1 | 5/2007 | Yee et al. | |
| 2008/0198340 A1 | 8/2008 | Tsai et al. | |
| 2010/0053558 A1* | 3/2010 | Yanagisawa | G03B 21/142 |
| | | | 353/20 |
| 2013/0120720 A1 | 5/2013 | Hellin et al. | |
| 2016/0136889 A1 | 5/2016 | Rolland et al. | |
| 2017/0182708 A1 | 6/2017 | Lin et al. | |
| 2018/0029299 A1* | 2/2018 | Aknin | B29C 64/112 |
| 2018/0101086 A1 | 4/2018 | Tanaka et al. | |
| 2019/0329250 A1 | 10/2019 | Beckwith et al. | |
| 2021/0009750 A1 | 1/2021 | Collin et al. | |
| 2021/0016496 A1 | 1/2021 | Chen et al. | |
| 2021/0031459 A1 | 2/2021 | Jessen et al. | |
| 2022/0035228 A1* | 2/2022 | McAllister | G03B 21/147 |
| 2022/0300733 A1* | 9/2022 | Wang | B06B 1/0629 |

FOREIGN PATENT DOCUMENTS

| | | |
|---|---|---|
| CN | 107290918 A | 10/2017 |
| WO | 9806560 A1 | 2/1998 |

OTHER PUBLICATIONS

Claremont Scholarship @ et al: "Claremont Colleges Maskless Projection Lithography Recommended Citation," Pomono Senior Theses. Paper, Jan. 1, 2003 (Jan. 1, 2003), pp. 1-49, XP055918844, Retrieved from Internet: URL: https://core.ac.uk/download/pdf/70969868.pdf [retrieved on May 7, 2022].
EPO Application No. 19862636.8, European Search Report dated May 20, 2022.
EPO Application No. 19862636.8; EPO Office Action dated May 23, 2024.
Hooper, Kent Richard, "Developing Ultra-High Resolution 3D Printing for Microfluidics" (2022). Theses and Dissertations. 9641. https://scholarsarchive.byu.edu/etd/9641.
Nelson Pascal: "Geometric Optics for DLP," Dec. 31, 2013 (Dec. 31, 2013), p. 1-16, XP055918853, [retrieved on May 7, 2022].
Sehnal, Petr et al.; Novel Phosphine Oxide Photoinitiators; ResearchGate publication No. 262514138; Conference Paper 2014.
Bohn, Daniel et al.; Determination of the UV-curing degree of thin films by crosslinking byproducts of reacted photo initiators in the UV-A & VIS-region of the spectra with actual polymerization degrees obtained from NIR-readings; International Circular of Graphic Education and Research, No. 10, 2017.
Bishop, Timothy E.; Multiple Photoinitiators for Improved Performance; DSM Desotech, Inc. Elgin IL; http://www.radtech.org/proceedings/2008/papers/072.pdf.
Andrzejewska, Ewa; Photopolymerization Kinetics of Multifunctional Monomers; Progress in Polymer Science. 26. 605-665. 10.1016/S0079-6700(01)00004-1; 2001.
M-511.HD Nano-Precision Heavy Duty Stage; https://www.pi-usa.us/fileadmin/user_upload/pi_us/files/product_datasheets/M511_HD_Precision_Positioning_Stage.pdf.
Sitzmann, E. V., PhD; Critical photoinitiators for UV-LED Curing: Enabling 3d Printing, Inks and Coatings; Radtech UV.EB West 2015; Redondo Beach CA; Mar. 10, 2015.
Ovsianikov, A. et al.; Three-dimensional laser micro and nanostructuring of acrylated polyethylene glycol materials and evaluation of their cytotoxicity for tissue engineering applications; Acta Biomater. Mar. 2011;7(3):967-974.
Bagheri, Ali et al.; Photopolymerization in 3D printing; ACS Appl. Polym. Mater. 2019 1, 593-611.
Ferraz, de Almeida Monteiro Melo et al.; 3D printed mold leachates in PDMS microfluidic devices; Sci Rep 10, 994 (2020).
Rundlett, Beth Ph.D.; Photoinitiator Selection—DSM Functional Materials; Apr. 30, 2012 Radtech Technology Conference.
Dolomite: 3D Fluidic Factory product page from website; https://web.archive.org/web/20170620163544/www.dolomite-microfluidics.com/USD/webshop/fluidic_factory as downloaded Nov. 16, 2022.
Au, Anthony K. et al.; Mail-order Microfluidics: Evaluation of Stereolithography for the Production of Microfluidic Devices; Lab Chip. Apr. 7, 2014;14(7):1294-1301.
Bhattacharjee, Nirveek et al.; The upcoming 3D-printing revolution in microfluidics; Lab Chip. May 21, 2016;16 (10):1720-42.
AU, Anthony K. et al.; 3D-Printed Microfluidics; Angew Chem Int Ed Engl. Mar. 14, 2016;55(12):3862-81.
Urrios, Arturo et al.; 3D-Printing of Transparent Bio-Microfluidic Devices in PEG-DA; Lab Chip. Jun. 21, 2016;16 (12):2287-2294.
Gong, Hua et al.; Optical Approach to Resin Formulation for 3D Printed Microfluidics; RSC Advances 5; Dec. 2015.
Gong, Hua et al.; Custom 3D printer and resin for 18 $\mu$ m × 20 $\mu$ m microfluidic flow channels; Lab Chip. Aug. 22, 20177; 17(17): 2899-2909.
Rogers, Chad I. et al.; Microfluidic Valves Made From Polymerized Polyethylene Glycol Diacrylate; Sens Actuators B Chem. Feb. 1, 2014; 191.
Beauchamp, Michael J. et al.; Moving from Millifluidic to Truly Microfluidic Sub-100-$\mu$m Cross-Section 3D Printed 19 Devices; Anal Bioanal Chem. Jul. 2017 ; 409(18): 4311-4319.
Rogers, Chad I. et al.; 3D printed microfluidic devices with integrated valves; Biomicrofluidics. Jan. 13, 2015;9 (1):016501.
Gong, Hua et al.; High density 3D printed microfluidic valves, pumps, and multiplexers; Lab Chip. Jul. 7, 2016; 16 (13): 2450-2458.
Waheed, Sidra et al.; 3D printed microfluidic devices: enablers and barriers; Lab Chip, 2016, 16, 1993.
Macdonald, Niall P. et al.; Comparing Microfluidic Performance of Three-Dimensional (3D) Printing Platforms; ACS Publications Anal. Chem. 2017, 89, 7, 3858-3866.
Li, Feng et al.; Increasing the functionalities of 3D printed microchemical devices by single material, multimaterial, and print-pause-print 3D printing; Lab Chip, 2019, 19, 35-49.
Lee, Howon et al.; 3D Printing Using a Digital Projector and its Application in the Study of Soft Materials Mechanics. Journal of Visualized Experiments; Nov. 2012.
Zheng, Xiaoyu et al.; Design and optimization of a light-emitting diode projection micro-stereolithography three-dimensional manufacturing system; Review of Scientific Instruments 83.12 (2012): 125001. © 2012 American Institute of Physics.
Beebe, David J. et al.; Physics and Applications of Microfluidics in Biology; Annu. Rev. Biomed. Eng. 2002. 4:261-86.
D'Aveni, Richard; The 3D Printing Revolution Richard D'Aveni; Harvard Business Review; May 2015.
Avobenzone Absorption Spectrum Graphs; Electronic Supplementary Material (ESI) for Photochemical & Photobiological Sciences; The Royal Society of Chemistry and Owner Societies 2020.

(56) References Cited

OTHER PUBLICATIONS

Tinuvin 384-2 Technical Data Sheet; BASF Corporation; Industrial Coatings, Printing & Packaging; Oct. 2019 Rev 5.

Tinuvin 400 Technical Data Sheet; BASF Corporation; Industrial Coatings, Printing & Packaging; Oct. 2019 Rev 4.

Tinuvin 477 Technical Data Sheet; BASF Corporation; Industrial Coatings, Printing & Packaging; Oct. 2019 Rev 4.

Tinuvin 1130 Technical Data Sheet; BASF Corporation; Industrial Coatings, Construction; Oct. 2019 Rev 6.

Masson F. et al.; UV-Curable formulations for UV-transparent optical fiber coatings; Elsevier; Progress in Organic Coatings 49 (2004) 1-12; https://doi.org/10.1016/S0300-9440(03)00122-X.

Kuo, Alexandra P. et al.; High-Precision Stereolithography of Biomicrofluidic Devices; Adv Mater Technol. Author manuscript; PMC Jun. 2, 2020.

* cited by examiner

| Technology | Standard Service PDMS | Skyphos uDLP |
|---|---|---|
| Minimal Feature | 1 um - 5 um | 2.5 um-25um |
| Minimum Channel Width | 10 um to 20 um | 10 um |
| Print on Substrate | Yes | Yes |
| Printable Layer height | 10 um to 100 um | 5-500 um |
| Surface Roughness | <1um | <1um |
| Build Area 38x20 or larger | Yes | Yes |
| Clear and Biocompatible Resin | Yes | Yes |
| Time for device | 180-600 min | 3-10 min |
| Time for 1st prototype | 6-10 weeks | 3-5 days |
| Cost for 1 prototype | $1,000 | $100 |

| Filter Number | Cure Depth (um) | Exposure (s) | Repeats (n) |
|---|---|---|---|
| 1 | 20-75 | 1.5-600 | 10 |
| 2 | 125-422 | 1.5-600 | 10 |
| 3 | 102-311 | 1.5-600 | 10 |
| open | 500- 2852mm | 1.5-600 | 10 |

Figure 6 A-D

FRONT                    SIDE

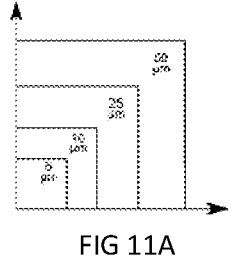
FIG 11A
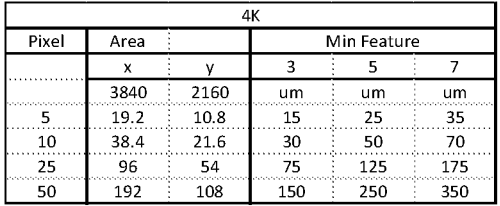
| 4K | | | | | |
|---|---|---|---|---|---|
| Pixel | Area | | Min Feature | | |
| | x | y | 3 | 5 | 7 |
| | 3840 | 2160 | um | um | um |
| 5 | 19.2 | 10.8 | 15 | 25 | 35 |
| 10 | 38.4 | 21.6 | 30 | 50 | 70 |
| 25 | 96 | 54 | 75 | 125 | 175 |
| 50 | 192 | 108 | 150 | 250 | 350 |
FIG 11B
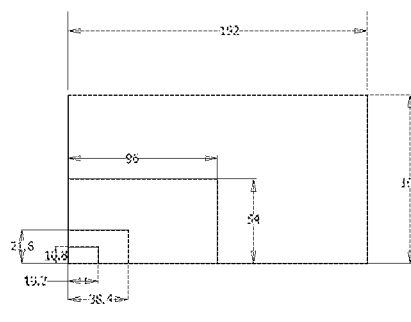
FIG 11C
| | | 2k | | 4k | | 8k | |
|---|---|---|---|---|---|---|---|
| | | 1920 | 1080 | 3840 | 2160 | 7680 | 4320 |
| 5 | | 9.6 | 5.4 | 19.2 | 10.8 | 38.4 | 21.6 |
| 10 | | 19.2 | 10.8 | 38.4 | 21.6 | 76.8 | 43.2 |
| 25 | | 48 | 27 | 96 | 54 | 192 | 108 |
| 50 | | 96 | 54 | 192 | 108 | 384 | 216 |
FIG 11D
Figure 11 A-D

| Factor | | Determinant | Weighted |
|---|---|---|---|
| | Pixel Size | Smallest feature | Low |
| Intra-Layer | Percentage of layer with small pixel | One pixel size or two or more | Mid |
| | Number of pixel size required | Number of changes vs tolerance required | High |
| | Number of moves | Time for number of exposures vs [time for pixel size (x) focus time] | High |
| | | | |
| Inter-Layer | Number of similar layers | Pixels match between layers (x) slice height | High |
| | Z dimension Anti-aliasing required | Tolerances and critical features (i.e. inlet vs interrogation area) | Mid |

Filter 1: 320-385
(FWHM)

C

Filter 2: 235-390
(FWHM)

D

Filter 3: 270-375
(FWHM)

ADDITIVE MANUFACTURING PLATFORM, RESIN, AND IMPROVEMENTS FOR MICRODEVICE FABRICATION

CROSS-REFERENCE TO RELATED APPLICATIONS

This application is a continuation-in-part of U.S. patent application Ser. No. 17/277,540, filed on Mar. 18, 2021, which claims priority to PCT/US2019/051797, filed Sep. 18, 2019, which relies on the disclosures of and claims priority to and the benefit of the filing date of U.S. Provisional Application No. 62/732,841, filed Sep. 18, 2018. The disclosures of those applications are hereby incorporated by reference herein in their entirety.

BACKGROUND

Field of the Invention: 3D Printing (3DP), Additive Manufacturing (AM), microdevices, Microfluidics (uF), Point of Care Diagnostics (POC), and Lab on a Chip (LOC):

Three-dimensional ("3D") printing (or "3DP") is disruptive to standard manufacturing. A well attenuated 3D printer, directed at a particular and focused manufacturing area, has displaced well-entrenched manufacturing processes previously, for example, from 2014 to 2016, Phonak was the first to employ 3D printing to produce hearing aids. In just over 500 days the entire industry replaced mold-based fabrication methods it had relied on for decades and adopted 3D printing. According to the article in the Harvard Business Review, there were three market factors that drove this change:

Hearing Aids require high tolerances for a custom fit in the patient ear, 3D printing was finally able to meet these requirements;

The number of parts per design (or mold) was either low-volume or custom-made; and Speed: Due to the device scale, 3D printing was equal to or faster than mold-based fabrication. In short, 3D printing suddenly became more economical for the manufacturer than the decades-old mold-based methods.

3D printing is of interest in the development and mass fabrication of microdevices and microfluidics (uF). These technologies are typically used in biosensors, diagnostics, Lab on a Chip (LOC), or mimics of organic systems. These systems are used to investigate and further the understanding of key chemical processes and sensors in several industries such as oil and gas, agriculture, animal husbandry, as well as human healthcare (e.g., genomics, proteomics, and phenotyping). Because these methods can offer significant cost and time savings, and offer new actionable information, and have been heralded for their potential to revolutionize patient care, including remote healthcare and infrastructure, bioreactor/tissue fabrication, organ regeneration, and biomedical applications in a clinic or hospital setting. However, to date, uF and other associated technologies have hit a prototyping and fabrication roadblock due to their reliance on semiconductor fabrication methods which adds prohibitive costs and year-long timelines for prototyping. Until very recently, 3D printing systems have been unable to combine both the feature sizes required (e.g., <100 um) with the larger print scales needed to pack all components on a device (e.g., 30-70 mm), and the integration of chip-to-world connectivity. (Reference: Nordin, Fouchs, Spadaducci, Fang, etc.)

Generally, 3DP is viewed as a slower process than mass fabrication like molding. It is seen as a bridge to manufacturing and is mainly used for rapid prototyping or small batches for initial product development. However, as shown herein, 3DP can challenge the current paradigm because in the correct application it is both a product development accelerator and a flexible/agile manufacturing platform. As applied to the unique requirements of micro-parts, uF, etc., AM/3DP systems surpass the current manufacturing methods at all stages of the product lifecycle.

Description of Related Art 3D printing or additive manufacturing (AM) is a known manufacturing process. Generally, to produce a solid model, a 3D CAD model of an object is sliced into layers via slicing software, each layer being the same thickness defined by the user, usually between 20 um and 100 ums. Layers are then sequentially printed in order and totality to create a solid model in the physical world. There are several types, but the current invention focuses on vat-based, which includes digital-light projection (DLP), laser-based stereo-lithography (SLA/MSLA) and LED/LCD based, and 2-photon-polymerization and use resins with an active photo-initiator. In this process, once the image projection is complete and polymerization/bonding has occurred, the stage/elevator will move to a position sufficient to allow the unpolymerized resin to flow back in and then return to a position for the next layer. This continues, one after another until the model is complete. At the end of a print, the devices are removed from the printer and build plate, washed with IPA or suitable solvent, and any open channels or areas where resin remains flushed. The parts are allowed to dry and a final cure in a UV oven occurs.

Fused Deposition Modeling (FDM) Printer:

Most people first become familiar with 3D printing through FDM machines that use thermoplastics, which are flowable at elevated temperatures and reform after cooling. An example is Dolomite micro-Fluidics, which devised a 3D FDM printer with specialized algorithms for FDM style printers. Their main focus was the proper sealing of one layer to the next, as FDM devices are notoriously prone to leaks. Typical materials include polylactic acid (PLA), Polyethylene Glycol (PEG), and ABS. The raw materials arrive to the printer initially formed into thin filaments and wound on a spool. The filaments are heated and pushed through a nozzle with a small outlet in the 0.1-0.5 mm range. The plastic is extruded into a pattern for each layer of a 3D print. The resolution of features and objects is governed by tuning the layer height to a cross-section of the nozzle and the extruded shape of the polymer as it is compressed into the layer or line raster. In general, the smallest line these machines are capable of ranges between the actual cross-section of the nozzle and a multiplier number greater than 1 and less than 2, (i.e., a 0.5 mm nozzle can produce lines between 0.5 mm and 1 mm). FDM printers do have easily accessible biocompatible materials. The best example of an FDM printer for use in microfluidic devices is the Dolomite Fluidic Factory. The main issue with all FDM technologies is the resolution precludes it from truly uF size range (>0.5 mm). Second, by the nature of extruded layers and lines, FDM is porous and difficult to ensure all layers are sealed and bonding throughout, thus leaving issues with microbes and biological targets being caught or leaching in areas.

Liquid or Resin-Based Printer (Vat Style):

Resin-based printers have two main orientations, top-down or bottom-up. These nomenclatures indicate the direction of a light source to the build area or platform. In this style of printer, a liquid resin comprised of one or more monomer(s) and/or oligomer(s), sometimes with plasticizers; a suitable photo-initiator that reacts with the light source of the printer. The resin also includes (usually) a photo-blocker ("PB") and/or dye which are used to limit the cure depth (penetration in Z) of the light source. The PB also acts to reduce bleeding over (beyond the illuminated area in XY) to reduce unwanted polymerization in previously printed layers, especially channels that are to remain open in the final part. After completion, the part is considered in a "green-cure" state, meaning it has structure but not final strength and has residual unreacted resin components. Finishing is completed by washing the green-cure in a proper solution bath such as Isopropanol (IPA) to remove residual resin from the surfaces, flushing channels, and using a final cure step placing the model in a UV chamber, sometimes with heat, to bring the strength up and eliminate any toxic remnants of resin (PI/PB/monomers) which can kill target cells or be dangerous to handling.

There are 4 main derivatives of resin-style printers: LCD, stereolithography (SLA), two-photon-polymerization (2PP), LED-DLP, and Projector-DLP. The major difference between each is a method of illumination used to create the polymerization reaction. All derivatives except for the projector-based DLP and 2PP printers use what is considered a "single source" light —either an LED array or laser, both of which have very definitive and short bandwidths. 2PP and DLP are discussed in more detail below but use either sub-light particle, projector-based machines typically use a standard Mercury bulb which has a wide spectrum from approximately 325 nm through visual and into the IR spectrum. Generally speaking, the light source for the non-projector-based machines lies within the UV regime, such as using a PI within the visible light spectrum which would result in polymerization during normal handling (though there are exceptions that have portions in the visible light spectrum like Igracure819). Typical single channels LEDs are 10-20 nm wide and centered at 365, 385, 395, or 405 nm, but note that LCD machines cannot readily use lower than 405 nm because the transmittance of the LCD screen drops to nearly 0% below 395 nm.

SLA-Printers:

This disclosure herein focuses on Vat-based printers. For example, FORM Labs 2 and 3 have a laser cross-section approaching 70 um and many LCD printers have Pixel resolutions between 20-50 um. The resulting features have minimal cross sections of approximately 150 um for solids and voids of 250-750 um however they cannot print features or enclosed channels below this threshold. SLA styles of 3d printers are unique in that they raster or trace a laser to the surface, and as such do not have pixel artifacts found in DMD/LCD which looks like steps or the serrations of corners on a diagonal. Channels need to be smooth with low surface roughness for microfluidics, so DLP style printers when operating near the limit of resolutions use "antialiasing" methods. Anti-aliasing is the blending of pixels in grayscale at the edges of solid-void to eliminate the pixel corners.

Bottom-Up Printer:

In a bottom-up printer, the light source is below the resin and projected through a window to cure the resin; LCD, DLP, SLA printers all have versions of this style. During the printing, between each layer, the build platform is raised a small distance in Z in a "peel-step." This is required between each layer to detach the cured material from the bottom of the vat and allow the uncured new resin to fill back in. Most bottom-up printers like LCD and DLP cure the entire layer at once, eliminating the longer process or rastering across the entire layer until the beginning of the next. SLA printers use the laser incident spot and trace that incident spot in a rastering motion like FDM printers to fill much like a crayon color in between the lines.

The motion of the elevator in Z, or the peel-step between each layer adds to the time it takes per layer. After curing or printing the layer, the elevator will raise up a certain height, usually around 5 mm to allow the liquid resin to backfill under the elevator and the previously printed layer. After allowing suitable time the elevator will return to the position for the next layer to be printed. In many cases, the curing step takes 2-10 seconds per layer and the peel-step adds 15-30 seconds more—in some cases more time than the polymerization itself As the peel-step is mechanical serving only to refresh the exact amount of resin needed in the areas required for the next layer and it can take a longer time than curing a single layer, it would be advantageous if one could eliminate or shorten the peel and exposure times to increase the build speed.

Continuous Liquid Interface Production (CLIP):

This technology was specifically developed to eliminate the peel-step, which takes considerable time and can introduce layering effects that look like steps and increase surface roughness. As mentioned, a surface roughness below a 1 um threshold is required for microfluidic devices which rely on stable laminar fluid flow. In CLIP, an oxygen-permeable material is used in place of standard materials. This allows oxygen present in the environment to penetrate the membrane and saturate a thin layer of resin just above. As oxygen is an inhibitor to the curing process, it creates a small buffer thickness of resin which is resistant to polymerization. The window is still transparent to UV light which polymerizes the resin except for that small thin layer of resin. Above this layer, the bulk resin in the vat does not have a significant content of dispersed $O_2$. This bulk resin is in contact with the elevator or previous layers. This allows a bottom-up printer to function without the peel-step. By moving slowly, and essentially drawing the resin up from the bottom in one continuous motion the pixels are changed between layers, like a movie, and use grayscale to enhance the cure tolerances.

However, this process is severely limited by the viscosity of the resin—the higher the viscosity the longer the resin will take to move into and refill the area of the last layer. CLIP technology is also cost-prohibitive. CLIP claims to be 25-100× faster than other printers, but in reality, when compared to other bottom-up DLP styles it is about 1.5-6× faster. This advantage is not eliminated in open-source printers' systems like Gizmodo which are "top-down" and have an open tank with oxygen present naturally from the atmosphere; they can print at the same speed.

Top-Down Printer:

Top-Down printers cure resin via a light source above the vat which is focused on the upper surface of liquid resin. As each layer is printed, the build platform is lowered into the resin vat sequentially after each step/layer or in one continuous motion. In one example, Gizmodo out of Australia, uses continuous light exposure in a video clip to cure the resin with no layer lines present. An advantage exists in that there is no need to introduce $O_2$ permeable membrane layers as the chamber contains natural $O_2$ at atmospheric pressure which slows or retards the polymerization. The overall detractor to this style of printer is that the vat must be tall enough to enclose the entire height of the object to be printed. In some cases, manufacturers, like Boston Micro Fabrication (BMF), found the need to use a membrane and roller due to the slow backfill of thicker viscous resins and maintain focus on the surface to maintain tolerances for microdevices due. This membrane prohibits the above advantages as it is not oxygen permeable. Outside of specialized optics and far-field lenses, the current limitation for resolution produced by both printer styles is limited to pixel size.

LCD:

Like a visual solenoid, a Liquid Crystal Display (LCD) uses voltage to "open" or "close" pixels on a transparent section of thin glass. The passage of light via pixels that alternate between black (eliminating light) and clear when switched between energized or not. An LED array below the LCD screen passes light to the resin in the specific areas to be polymerized only when the pixel affecting that area is open/clear. Beyond being cheap to manufacture, the advantage here is that a pure light source or diode laser source can be chosen to precisely fit the PI selected. However, there are two major drawbacks to LED/LCD setups. The smallest pixel for LCDs is currently 22 um (Phrozen) and 3-5 pixels in width are required to form an open channel, the smallest able to be created are about 150 ums. Microfluidic devices require features and enclosed channels in the 5-20 um range, so this precludes these 3D printer systems from use in true microfluidics. Further to this point, LCDs will be difficult to shrink much below this segment because there is a physical device needed to create the open/closed pixel requiring switching, electronic connections, etc. (See, https://en.wiki-pediaorg/wiki/Liquid-crystal_display#:~:text=A%20liquid%2Dcrystal%20display%20(LCD, images%20in%20color% 20or%20monochrome.) Second, the light sources which can be used are limited. LCD screens, in the open position, transmit only 6-8% of the light at 405 nm, and about 2-4% for 385 and ~0% below that. Most biocompatible and clear resins use PIs at 385 and 365 and even down to 325. Further confounding the issue is the surface roughness for LED/LCD machines which is generally too high for uF use in practice.

Micro-DLP—Micro-SLA:

Current technology uses high-powered and expensive parts which are 10× higher than a projector. For example, a microscope objective (Vidascope or other $50,000+) along with a DLP projector kit from Texas instruments ($6000). The light engines are based on a single LED array of 365 nm or 385 nm from Nordin/Acrea, and 405 nm in the case of BMF/Fang. Generally, these platforms are limited by focusing optics, aberrations in the lens, and the DeBye number (½ the wavelength used for polymerization). The smallest resolution claimed so far is ~2 um through the use of far-field lenses by BMF and Nick Fang group at MIT. All machines use a custom set of optics and provide only one resolution setting or size, this limits the adaptability and applicability of the printer to a particular scale—micro, because the DMD mirror array has a certain number of pixels—as these pixels are reduced in size to hit a resolution, so too is the total XY volume of the system. Unfortunately, these systems do not have the latest DMD sets available due to expense and small market for DMDs.

As to Z motion, micro-printing systems employ either a set of stepper motors and lead-screws with matched linear rails or a nano-resolution stage from suppliers like Thor, Edmunds, or Pi-USA, thus the base cost for materials on these machines is near $70k-$100k prior to any software development or machine translation for staging and repeat movements.

While several DIY 3D printer kits attempt to use additional optics on the outside of the projector and after the final lens to shrink the pixel aspect remains at 18-20 um, this is still not acceptable for the 1-10 um preferred and required for Fluidics. Further, these lenses introduce aberrations and distortions in the print which preclude them from use in high tolerance parts.

2-Photon-Polymerization:

This technology uses sub-light particles and are capable of producing feature sizes below 100 nm and into the macro range. Their advantage beyond feature size is that they can produce devices truly within the nano to microscale, and macroscale devices.

While it is impressive to reduce the size of the pixel, this effort introduces another limitation: a set of exceedingly small resolutions means much longer print times. Small pixels mean each part, feature, and layer—whether needing that size resolution for features or not—will be printed with that size. 2 um vs 20 um resolution means a 100× penalty in the number of moves and exposures (X multiplied by Y). If each move requires 10 seconds to move the projector to a new position, this means 1000 seconds per layer is spent just moving to the extra positions. At 10-second exposures per layer, it is another 1000 seconds, meaning it requires 2000 seconds extra seconds per layer. At 100 layers, it would take over 16.5 hours longer to print the higher resolution device vs. 30 minutes to produce the one with lower resolution. Most microfluidic devices using these printers would take around 8-18 hours to print one device.

While they excel at features in 3D, the time it takes to complete one part is a problem. In a manufacturing environment to enable the fabrication of 100's to 1000's of devices per day, the scale-up for the number of machines is unrealistic, the machines are too expensive, slow, and take highly trained individuals to operate.

Speed is a factor that needs to be considered. If 3D printing is to compete against mass fabrication, it would need to beat cycle times of 15 minutes for hot-embossing, and the 3-90 seconds (per layer) of injection molding. This would be a welcome addition for providing rapid prints with the ability to resolve any features. In fact, comparing the timelines of a 3DP moving from drawing to part, as opposed to a drawing, mask, device layer, and assembly it is much faster.

A Final Note on 3D Printing Manufacturers Specifications for Resolution:

The resolution and minimal feature size for SLA is controlled by the gaussian laser cross-section as it impacts the vat (usually considered at FWHM). In the case of DMD-based and LCD screens, the size of the pixels in X and Y as they are displayed on the actual build plate is known as "pixel pitch". Generally, it is accepted that the minimum feature size is near 4-5× the pixel or laser width, and the minimal void possible is about 3-4× pixel size for DLP and 4-6× LCD (though with high surface roughness). Often, the minimal pixel aspect is incorrectly referred to as resolution for feature sizes in marketing materials; taken this way, a manufacturer's specifications for minimal feature sizes are incorrect.

The science of microfluidics requires devices with smooth walls and tight tolerances for channels and artifacts close to the single micron size range. To perform the development of these devices, researchers would require pixels in the range of 500 nm-10 um. Most DLP projectors hit a lower limit between 20-50 um in pixel pitch, resulting in a resolution of a solid feature or open channel close to 100 ums. In the cases where needed feature sizes are close to or below a proper size, the printer will generate not smooth lines but a pixelated image.

As stated previously, these systems are limited in that the build area per layer is directly tied to the minimum feature sizes (pixel aspects) are innately tied to the DMD; smaller pixels mean smaller build areas. According to the mathematics, a 10-um pixel with a 4K (3840×2160) pixel can only produce a 38.4×21.6 mm device, and a 20-um pixel on the same DMD can produce a device at 76.8×43.2 mm. This illustrates the problem to create objects of a usable size because most LOC devices require upwards of 25×75 mm area prints, but to create most of the features requires pixels between 1-5 um and a speculated maximum of 10 ums. Currently, it appears that no 8K micro-DLP printer exists.

Attempts have been made to address the minimal pixel aspect needed, but improvements are needed due to common issues noted above and herein.

Next Generation Printer Needs:

The previous offerings of 3D printing systems have not yet attained the ability to complete the three tasks of needed resolutions (1-10 um), producing surface quality with roughness at or below 1 um, to print devices needed at this level, biocompatible resin, which is also clear and low-auto fluorescence, and a printer which can enact a large enough printable area (75×75 mm).

The invention herein enables new features, by way of example only, decoupling pixel and ultimate feature resolution from a static set of pixels, increasing the maximum working cross-section (XY) in galvo LCD and DLP based 3D systems, allowing sub-pixel resolutions on LCD/DLP based machines, such as, in aspects, via mechanics and software to enable these style machines to emulate a laser galvanometer-based system.

In embodiments, the invention allows for production of parts at a rate fast enough to compete at 1-2 minutes per device, or with a folding device for 5-15 minutes. These are non-limiting examples only.

Improvements need to be developed to overcome the noted limitations, and the current invention presents several innovations to enable this ability.

Microfluidics and Microdevices:

For more than three decades the fabrication of uF devices and their disciples has relied on semiconductor technology, Si-wafer fabrication, and lithographic methods re-appropriated from the industry to create molds. The method of fabrication via molds to make individual layers and then assembling/stacking layers has limited gains as the complexity increases while having a lower success rate due to device failure. These limits mean device construction requires well educated operators, 100's of steps, a clean room to convert the mold to a working prototype. Oftentimes results from devices made by different operators are inconsistent even though all are highly trained. The time and expense have placed the burden of prototyping and production of these devices/breakthroughs onto the literal hands of researchers, creating a need for incredible expertise and infrastructure. Additional technology for prototyping through fabrication and new capabilities for this burgeoning area of research has been stagnant over this same period of time because all progress is tethered to incremental improvements for both materials and fabrication methods in an industry that is focused on electronic and memory applications for computers and circuits as opposed to biology-based.

This limiting fabrication process means that ideas can take upwards of 6 months to turn into prototypes, the process is exceedingly expensive—with costs upwards of $10k for a single prototype. Therefore, a need exists for a new method of manufacturing, from prototype through production—to create smaller feature sizes with high surface quality to enable the fabrication of high-tolerance components including medical device components, microfluidic devices, and their components such as Lab on A Chip (LOAC), Micro-Electro-Mechanical Systems (MEMS), highly complex manifolds and connectors, and some experimental components such as pipette tips, syringe tips, optical waveguides.

Problematic customer experiences with current 3DP technology compared to the requirements for the functioning platform and process are distilled below. They include but are not limited to:

Surface roughness (<1 um)

Optical clarity (clear, non-colored)

Minimal feature size (1-100 um)

Enclosed channels (<100 um, prefer <50 um)

Overall device size (20-100 mm)

Based on research by the Applicant, different technologies exist but are not currently adequate, and the current invention is an inventive improvement thereon.

Limitations in the current field include but are not limited to speed, post-processing, overall build size, and cost for expertise and underlying machine. Further, because printers rely on a single light channel, bandwidth, or wavelength—usually via an LED array—they can also be limited to the number of compatible resins with the light-source. Accordingly, the current invention is an improvement on the state-of-the-art.

Related art includes:

U.S. Patent Publication number 2021/0009408, which teaches using one type of sight spectrum from an LED array. This teaching has limitations in regard to cure depth that are improved upon with the current invention.

U.S. Patent Publication No. 2017/0057162 refers to a micro3DP method but teaches the use of far-lenses which enable features below the Bragg-Limit of ½ wavelength (e.g., far-field lens optics and technology). However, limits to change resolution or depth of cure are improved upon by the current invention.

U.S. Pat. No. 9,574,039 teaches, e.g., using two different photo-initiators to allow curing after green state. Toxicity issues that could result from that reference are improved upon by the current invention.

SUMMARY OF THE INVENTION

In embodiments, the current invention provides a 3D printing platform, such as a complete platform, allowing for 3D printing of microdevices for applications in microfluidics, LOAC, POC-diagnostics, drug discovery, custom liquid handling, as well as for applications having comparable size requirements or micro-features, such as cross-technology to MEMS and optical waveguides. It can include resin, a computer processor for calculations and programming based on, e.g., predetermined parameters, a light engine or projector or home entertainment projector, and/or motors with automated mechatronics.

The general and accepted process of 3D printing is defined as a layer-by-layer process—wherein each layer is the same thickness as the preceding—meaning all layers are the same. According to the current invention, it allows different, sometimes substantially different, layer heights (e.g., approaching 100× differences between each, such as 10 um vs 1 mm). In addition, the current inventions allows for the use of individually addressable pixels, groups of pixels from one exposure, multiple groups from a moving projector, and areas of single, intermixed, and independent layers, for custom cross-linking and interior surface roughness of channels and sections of those channels.

In aspects, this invention includes the creation of this 3D printer or additive manufacturing (AM) platform and resin formulation for the purpose of creating microfluidic and microdevices via layer by layer and voxel by voxel method(s). The process/system can display pixels on the polymerization surface between 0.1 and 100 ums with a DLP projector which uses a wide spectrum bulb (such as NMHi, metal-halide bulb, Hg, or bank of several LED bulbs, or UV to visible light). In aspects, it can utilize a filter set to attenuate the bandwidth reaching the working polymerization layer (the layer between the top of the vat window and the bottom of the elevator/stage/glass slide). The bandwidth (range of optical frequencies, e.g., 355 nm to 385 nm), being controlled in aspects by the filter set, tunes the cure depth for a given segment (in Z) of the solid being created. The light source can be targeted and focused using an apparatus as described in U.S. patent application Ser. No. 17/277,540, filed on Mar. 18, 2021, as incorporated by reference herein. Further, the current invention allows for use of a gantry system to take advantage of temporal areas of displayed pixels emulating and enhancing the methods of SLA-style printing.

In aspects, because of the nature of devices and size requirements, the current inventive printing system can offer advantages/improvements over the current state of manufacturing hot embossing and injection molding. By way of example, the typical limit for the number of assembled layers in mold-based uF is approximately 3-layers and has a 50% failure rate, with an 8-hour cycle time with a 4 mm height. According to the present invention, in examples, 3D printing can create a 22-layered device, with over 100 inlets and outlets, a 1.5 mm height, and takes 14 minutes to produce with a 90% pass rate; it can be direct from drawing to part, and does not require months waiting for a mold. This is faster when compared to semiconductor technologies which rely on molds that require two-month lead times, for example, or hot embossing which typically takes 12-45 per layer minutes for the same size and resolutions and has a 6-12 month lead time.

Microfluidics are typically devices such as a small cassette, cartridge, or "chip," varying in size from 1×1×5 mm up to 500×100×75 mm with notable features and designs both internal and external to said chip, such as channels, walls, pillars, valves, openings, vias (vertical channels), wall thicknesses or membranes, fluid passages, fluid reservoirs, reactant reservoirs, hollow passages (which may or may not be backfilled with solids, liquids, gels, or phase-changing matter), and other aspects of the notable features range in size typically set by the targets being studied, which usually falls at 1-10× the size of biological targets to be studied and interrogated, but sometimes can be up to 20× the size. Generally, this is between 1-200 um in a cross-section of one plane (e.g., XY, XZ, YZ, etc.), but it could cover devices with features of less than 200 um in a cross-section of one plane (e.g., XY, XZ, YZ, etc.), of less than 300 um in a cross-section of one plane (e.g., XY, XZ, YZ, etc.), of less than 400 um in a cross-section of one plane (e.g., XY, XZ, YZ, etc.), and of less than 1000 um in a cross-section of one plane (e.g., XY, XZ, YZ, etc.) for chambers. These small features on the device are for carrying, exchanging, extracting, moving, trapping, counting, analyzing, lysing (or breaking apart), mixing one or more fluids, cells, chemicals, biological entities, and other payloads for the purpose of gaining useful insight and/or data for decision making on patients, or a general process understanding of the interactions of those payloads and the other tests designed on the devices. These interactions are by way of non-limiting examples for proteomics, genomics, phenotyping, DNA sequencing, and re-grafting, bioreactor growth studies, Ph, oxygen content/saturation, conductivity, salinity, cell confluence, reactivity to electronic fields, signals, etc.

In addition, microdevices or microfluidics may rely on an auxiliary portion (or portions) of features of a device with channel(s) and/or features (s), such as open channels and connections, by way of example, within the 200-1000 um size range. Other terms and nomenclature such as Lab-on-a-Chip (LOC), point-of-care (POC), microdevices, MEMS, Optical waveguides, sensors, implants, vaccine delivery systems and related terms, can be used to describe the technology that relates to the invention described herein, so they would be understood by one of ordinary skill in the art to relate to the current invention and therefore the current invention could be used in such technological fields and cover such fields.

The current invention can include the capabilities for clear, biocompatible resins with single micron level resolutions of infinite size (XYZ) and can eliminate the need for any type of mold for prototyping or production. This affects the infrastructure of clean rooms, molds, personnel, and the like eliminating, by way of example in aspects, about 95% of the wait time for initial testing, such as testing of ideas. It can be fast enough to be used for mass fabrication. According to the present invention, agile and comprehensive device testing can be completed in shorter periods of time and for lower costs, and readily integrated into systems for Manufacturing as a Service (MaaS) and Industrial Internet of Things (IIoT).

The current invention can form solids by exposing a liquid resin to particular bands of light (spectrum) selected from the original light source (bandwidth) in a layer-by-layer format; with each layer being attached to the previous via the influx of uncured resin and subsequent exposure to UV light. To form the preferred object the layers function to create a realistic, and tolerance correct 3D device, and an intrinsic need exists to have areas and volumes of uncured resin interspersed with those which have already been cured. This can require that the depth of penetration for curing or polymerization is controlled and intentional, and with microdevices, this can be preferred. Usually, the consequence of this process is a singular depth of cure and hence "layer height" of slicing—every layer of an object is exposed to the same dose of UV light, in aspects.

The current invention can use multiple wavelengths and segments of the UV/Visible spectrum both between and within the layers to develop a multi-voxel polymerization method, controlling the depth (Z) and width (XY) of penetration independently and in real time or near real time between, through and within layers. The current invention includes a method for using a wide-spectrum light source with a spectrum that extends significantly beyond the boundaries of the UV absorption spectrum of the photo blocker.

The current invention can through-cure the device while on the machine elevator, which is different as compared to standard SLA/DLP, which requires curing in a separate chamber after removal from the 3D printer. Instead of using a single wavelength and extending exposure time per layer, the current invention can adjust depth penetration via the selection of segments within the UV and visible spectrum of wavelengths, as well as their duration and intensity at the same time during a single layer or any temporal period. This means a layer or portions of a device in Z may be cured at any time during the print. By using a light source with a wide spectrum and filters, different portions of the additive properties from competing material totals may be exposed to the device, allowing different penetration depths at different times of the device construction—allowing selective cross-linking or stiffening of internal device segments or complete device curing for enhanced burst pressure and resilience, while preserving the uncured resin within the channels.

This enhances the application of additive manufacturing using photopolymerization to solidify an object, adding new functionality and allowing additional control and fidelity over the depth of cure during the print process. This novel aspect of the method can allow several advantages over other 3DP systems; the speed of fabrication, reduction of post-processing, post-processing in-situ and controlled internal cross-linking for structure and strength, and/or fine-tuning via new dosing algorithms. Further, it can offer the ability to enhance the creation of internal structures important to the requirements and functionality of microfluidic devices and diagnostic tools based on these methods by allowing increased degrees of freedom in design.

In embodiments, the current invention can be a method of enhanced speed, fabrication and development of a uF device wherein, in aspects, the layers are deliberately different heights depending on the situational position and function within the device volume—e.g., channel walls or surfaces vs. bulk material (e.g., material 2× pixels from the channel wall). In addition, the invention can expand the ability to cure boundary segments (e.g., bulk: void) with different doses contained within a single exposure. This method can increase and selectively tune the cross-linking and light penetration to adjacent pixel areas which may or may not be active on the digital micromirror device (DMD). This can be used to enhance printing resolution below a standard pixel size/pitch. "Tune" can in aspects mean increasing or decreasing the polymerization rate, speed, and/or area, along with other parameters, via controlling the photon count and spread through wavelength and lumens. This can result in a new set of evaluation parameters for resin and its constituents as well as the controlling factors for polymerization.

Another aspect of the current invention pertains to the elevator platform, "Chip-Clip™" and the attachment method for glass slides to allow quick loading and unloading of a device to the machine. Within this same machine aspect, the current invention pertains to how to use a small camera to capture information on the print on a per-layer basis —this can allow for the ability to integrate quality control and capture data from each print. In aspects of the invention, the inventive machine/apparatus can use a pivot on the chip clip to allow faster lift and reset time for the resin to refresh between layers. This lift-reset time can be important to the speed of a print and typically is a constraint within the 3D printing community. In furtherance, the current invention described herein shows how to use a small gantry to reposition the elevator and build a platform allowing a larger object to be printed than can be done with a single projector or DMD. The invention is also a method to de-couple the projector from the pixel array—allowing pixels to be placed anywhere within the XY plane (in examples at, for example, ½. ¼, ⅛ and 1/16 of a pixel spacing, but it is limited only to the stepper motor and leadscrew pitch). In addition, the invention described herein shows how a motor could be used to alter the cartesian-based printer into a rotary-based method, eliminating pixel stepping in XY.

The current invention can automate the pixel pitch between and during layers for enhanced resolution and speed of printing devices, this is discussed in further detail later.

Thus, in aspects, the current invention is a 3D-printing system comprising an off-the-shelf home-based projector, specifically designed focusing apparatus, custom resin formulation, and low-cost parts for the creation of microdevices. The use of an off-the-shelf projector can allow futureproofing by the intrinsic and automated evolution of new and improved DLP projector systems each year. As an example, this system could currently be a 4K micro printing system, but future 8K projectors could also be used for the light-source. The 3D printer, in aspects, has a projected image pixel pitch which can be altered between 1 and 100 ums at any time before, during, or after the print. It can use a standard mercury bulb which has a spectrum from 325 nm through the visible light and into the infrared (+1000 nm), by way of example. It can employ a series of filters that select or tune the light/bandwidth/wavelength spectrum of the original light source coincident with the plane of polymerization. This can allow for the use of more resins and photo-initiators than possible with single channel (using one array of one LED type, e.g., 365, 385, 405 nm). The invention can use a standard resin—and by tuning the incident light spectrum—it can tune the depth of penetration and cure rate. Through empirical evidence, it is shown that this depth and rate of cure can be dependent on the two curves of photo-initiator and photo blocker along with the light spectrum allowed.

This can be demonstrated by fabricating several devices with channels and features at and below 100 um in a few minutes or less. According to the current inventive method, materials, and machine, an unexpectedly superior point of 3D printing has arrived according to current invention as compared to other mass fabrication methods such as high-cost Si wafer etching and low throughput PDMS replicate molds and changing materials once at mass-fabrication levels required by micro-injection molding. These improvements allow improvement to product development timelines and lower the need for additional experiments often created by the current manufacturing requirements of low-cost PDMS moving to high-cost and new materials at mass fabrication. Further, it allows for flexible and agile production lines, lower infrastructure costs, and eliminates the financial hurdle to treating diseases with lower prevalence. The production via 3DP according to the invention herein also illustrates the capacity to remotely fabricate new diagnostics which are currently unavailable due to these manufacturing constraints.

The features disclosed herein may be used singularly, in any combination, or combined based on the requirements and specifications of a given application or design.

BRIEF DESCRIPTION OF THE DRAWINGS

The accompanying drawings illustrate certain aspects of embodiments of the present invention and should not be used to limit the invention. Together with the written description the drawings explain certain principles of the invention.

FIG. 1B Table on microfluidic requirements.

FIG. 5 E-G Filter ranges depicted on projector bulb, according to embodiments of the current invention.

FIG. 11A-D Scenarios for pixel size, DMD array, ultimate build size and resolution, according to embodiments of the current invention.

FIG. 18 Decision making matrix, according to embodiments of the current invention.

DETAILED DESCRIPTION OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Figure 1A:
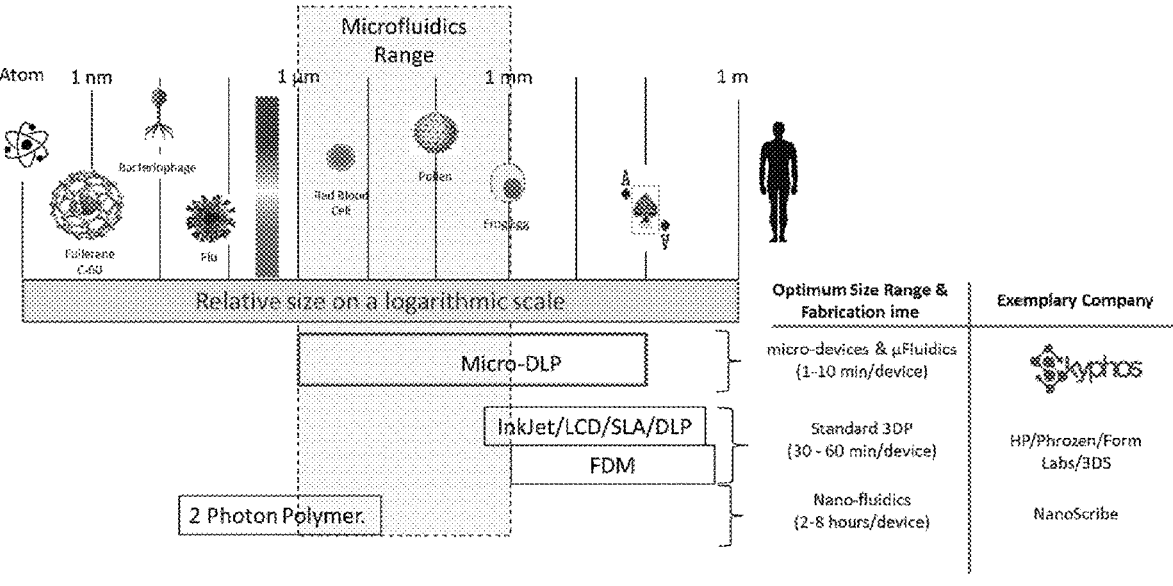
FIG. 1A Depiction of types of additive manufacturing vs physical size scale.

FIG. 1 illustrates the gap existing manufacturing gap—the inability of 3d printers to create objects in the macro word, the size of a credit card, along with features smaller than a human hair. Typically, printers can do one or the other but not both. FDM printers which use thermoplastics and a small nozzle, can print macro-objects but not micro features. The same is true for most vat style printers. These printers specialize in creating objects that can be held in the hand and with features visible to the naked eye, such as for dentistry and jewelry printers.

Printers also exist that specialize in the nano and microscopic area are those like 2PP. These types of printers can achieve features in hundreds of nanometers up to a few millimeters in size. The prints are highly specialized resins and take several hours to build. The ultimate size is limited and below the threshold for standard microfluidic cartridges that range from 2-20 cm.

Thus, the need for a microfluidic device resides in this gap area and cannot be serviced by standard printers.

The current invention, in aspects, includes a set of optics, mechanics, resins, and algorithms that can enable large format devices (macroscopic) and can print microscopic features in a clear resin. FIG. 1 area labeled "Skyphos" shows an example of a range that could be achieved according to the present invention.

Figure 2A:
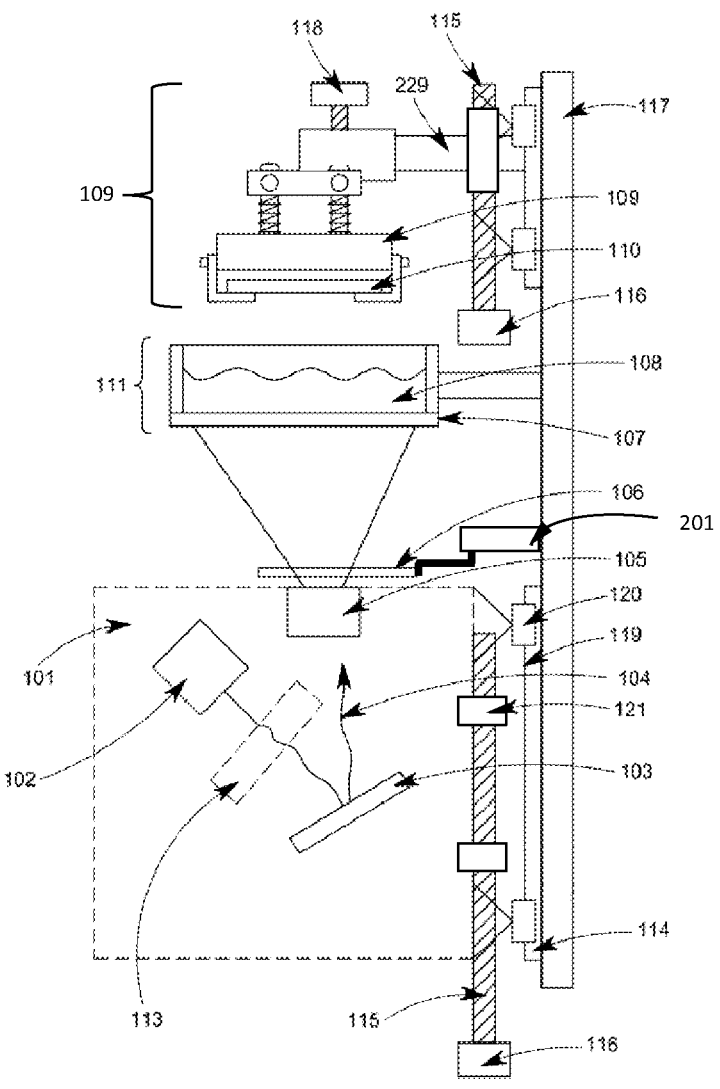
FIG. 2A Schematic of the invention.
Figure 2B:
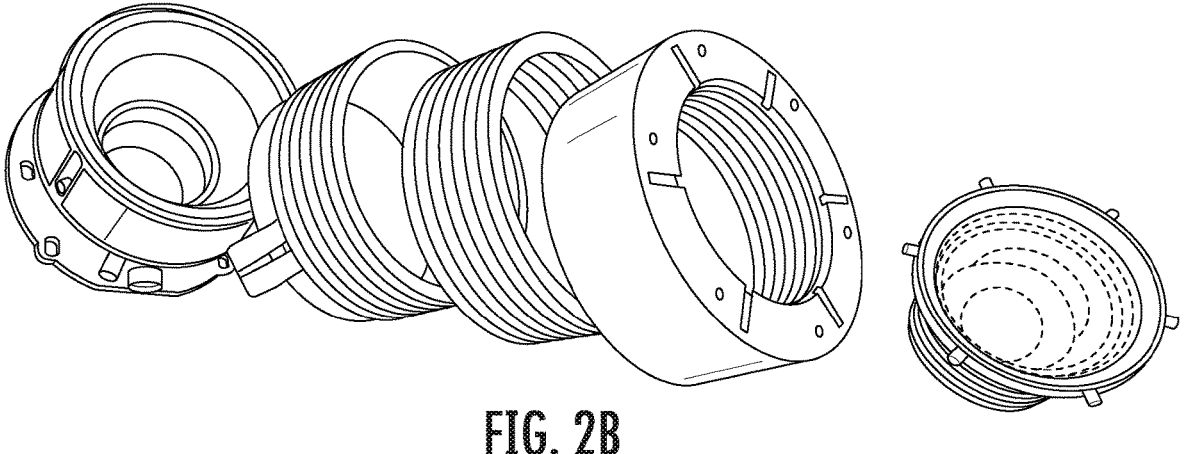
FIG. 2B-C Photographs of inventive/improved optic arrangement.
Figure 2C:
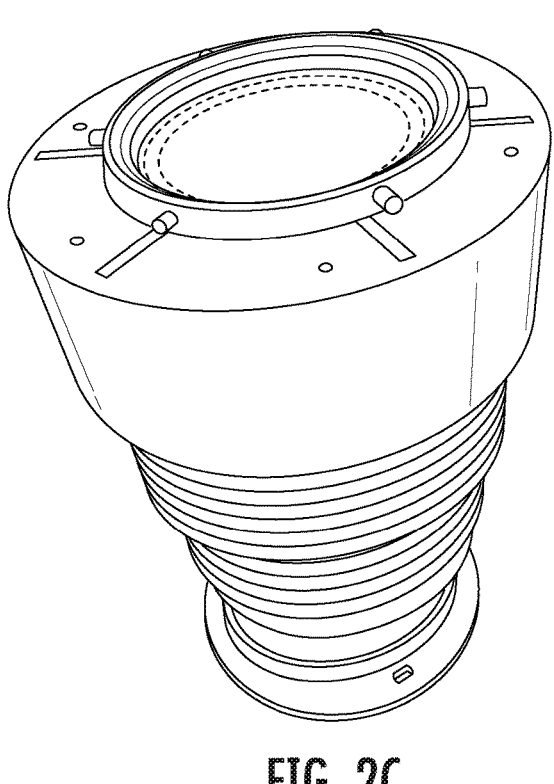

FIG. 2 shows a schematic of a vat-style bottom-up 3D printer according to an aspect of the current invention. Images can be displayed through the Projector (101). Inside the projector a light source (102) can be a wide spectrum standard projector bulb (preferably a metal halide bulb) at the Digital Micro Mirror Device (DMD) (103). The DMD, using micromirrors, can direct the light (104) to the pixel areas focused on the vat (111). The lens apparatus (105) can focus the pixels to a preferred size (e.g., 0.1 to 100 um) on said a window/working layer. After it exits the final lens, a filter pack on a shutter (106) controlled by a servo (201) can attenuate the full spectrum to the preferred band gap for layer height. This may also be done internally to the projector between the light source and DMD in the dashed area (113), in place of, or near the color wheel.

The resulting image of a preferred size and brightness can coincide with the vat window (107), which can be attached to the vat and subsequently attached to the frame of the 3DP (112). The light can penetrate the window on the vat which can hold photopolymerizable resin (108) and the build platform (aka Chip-Clip™) (109). It can display an image to be polymerized; it may be all or any portion of the current layer/active layer. If it is an initial layer, the Chip-Clip™ can hold the substrate which the object/device can be printed on, such as a glass slide (110). It can be inserted at the beginning of the print and brought to a preferred location at the "working layer." An area located between the top of the vat window and the bottom of the slide or last layer printed can be, in aspects, within 1 um to 2 mm. This is a larger range than standard 3D printers which have working ranges of 20 um-100 um. The working layer can be the current layer being printed. The working layer can also be known as the slicing height or layer height, and it can vary between 1 um and 2000 um depending on the filter selected, by way of example. The working layer thickness on a per-layer selection can be a different thickness. Additionally, each layer may have more than one exposure using a different filter and altering the addressable cure depth or working layer distance. After the segment of printing is complete (e.g., sometimes referred to as a "layer"), the platform can be raised to a sufficient height to allow the new resin to backfill in the area where the previous layer was solidified. The elevator can be brought back to the preferred position, depending on the working layer height. The cycle continues until the end of the part.

Figure 3:
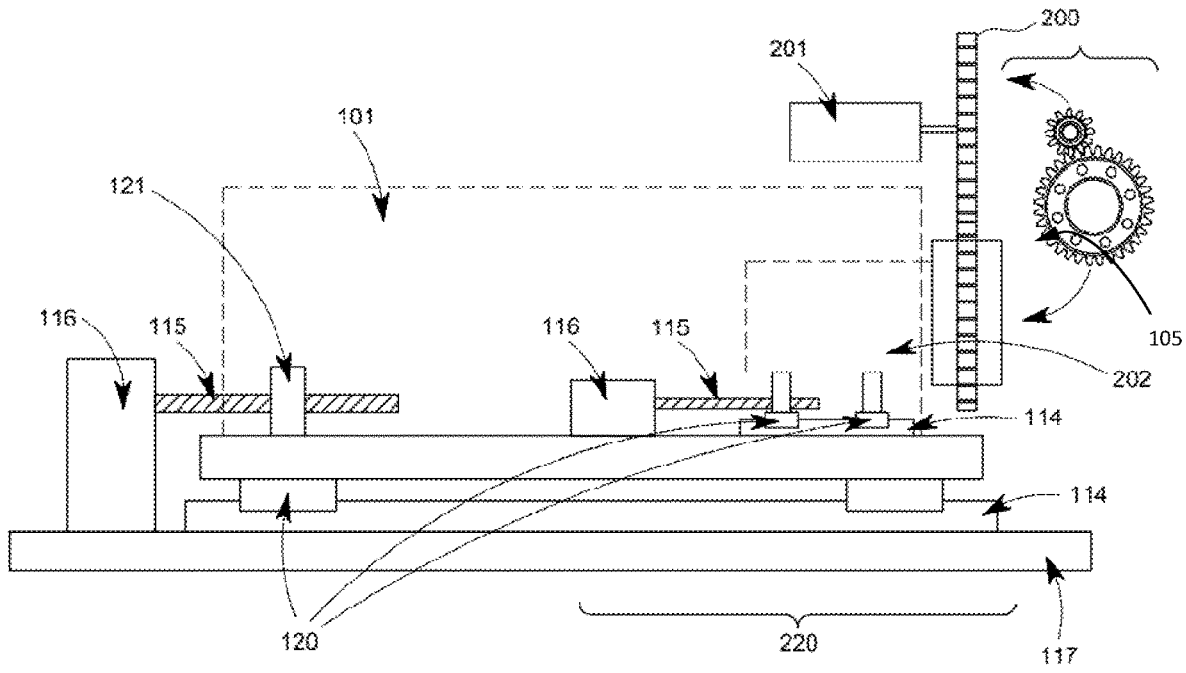
FIG. 3 Schematic of automated pixel focus, according to embodiments of the current invention.

The current invention allows for the ability to move and reposition the projector in Z to allow for automated positioning with a gantry and associated parts. Using the exemplary product in FIG. 2 and FIG. 3, for example, the invention can include a set of linear rails (114), stepper motor (116) or servo (201), and linear screw (115). The focus of the projector can be adjusted via two independent motors which control the fine focus via a gear set (200)(1) and the zoom (220) of the lens package, or via a linear guide. In this way, the current invention allows for movement of the projector lens distance and focusing in real time on the working layer. This overall range of projector travel or distance is generally from direct physical contact to the bottom of the vat window, to a distance of 500 mm below.

The projector positioning for each pixel aspect can be stored in a library lookup table of the 3D printer. If a pixel position is called for which is not available (e.g., in between two hard-coded pixels) a linear calculation can be performed for positioning via a JavaScript algo, by way of example. The JavaScript code may not directly be read by g-code and may only output the final numbers called for by the program. To perform the calculation, the algorithm can look for the preceding pixel and the next largest pixel in the library. Using these as the range it can then determine what percentage of this range is required and add this number to the preceding pixel location—thus providing the new coordinate to each motor. The master program can use the actual library number or the calculated step and a call movement in g-code can be sent to the three motors controlling projector positioning on the linear rails, focus, and zoom. General functions which describe the position for each motor given a set of parameters can be developed which then also eliminate the need for a direct library. This general function may be of a curve, logarithmic, quadratic, decaying exponential or linear, or determined by linear regression on a set of points for each motor along the total range of the pixel sizes or a combination of any above.

Shutter and Filter Set:

DLP printers and LCD-style printers can utilize a shutter, which when activated, eliminates some or all light from the bulb or LED array by interrupting the beam path. The control of the shutter can be initiated via a software signal to a servo motor. According to the current invention, it was determined that integrating filters between the originating light source and the vat window is, in aspects, a necessary step to attenuate and tune the light bandwidth. It was determined in most cases, but not all, that a single filter allowing a range of 10-50 nm was sufficient, but dual filters that have spectral overlaps are envisioned. Shutters that completely interrupt the light are important to use for control of light from the projector, as projectors even while displaying a "black" or "blank" screen during peel moves to refresh the resin allow stray light which can polymerize resin. Therefore, the current invention expands the design beyond a binary on/off shutter and introduces a series of optical filters to the shutter to both tune the light source after it exits the final projector optic and allows adjustability in the spectrum during the print. The selection of different filters and band gap of light which is directed to the working layer affects the speed and cure depth of the resin. Filter selection can be done by operator input or computer controls, such as a library look up table or a resin profile. A resin profile can be similar to a recipe and contain some of the controls to and instructions for the printer to cure a layer properly. FIG. 4 is a picture (4a) of the inventive shutter (106) described herein with two separate filter locations, a 365 nm filter (401) and a 385 nm filter (402), between the light source (102) and DMD (103) and after the final lens adjustment (105).

Figures 4A, 4B:
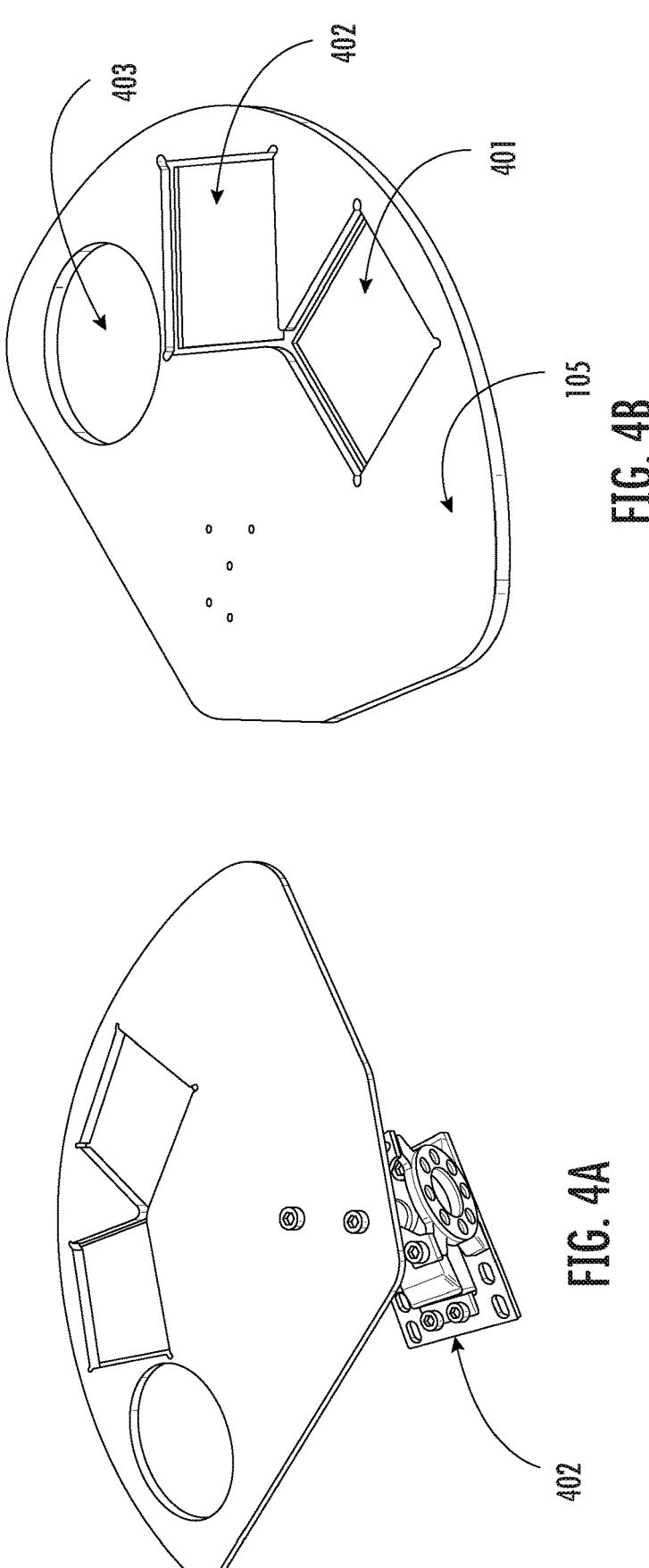
FIG. 4 Image and STL of shutter with filter locations, according to embodiments of the current invention.

This inventive shutter STL drawing in FIG. 4b still can be used for the purpose of blocking all light but adds a selection of band gaps were identified from experimentation and iterative tuning (empirical discovery) as to proper formulation to develop a resin with reactivity but controllable and tunable penetration depth of and rate of cure at each layer, or intra-layer. Between each layer, a shutter (106) can be activated via servo (201) or appropriate motion apparatus and attached to the printer. It can be rotated to distinct positions (401, 402, 403, 404)). These positions coincide with a completely open position (403)—(no filter), and several mounted light filters which may be interchanged by the user (401, 402)), and fully closed (404). These different filters vary in wavelength ranges that are allowed to pass, and are considered filtered or colored glass, and are tuned to the resin to allow different amounts and types of light to be displayed on the vat window.

In FIG. 5a-d, their bandpass ranges and percentages passed are shown. FIG. 5e shows the spectrum of an unfiltered projector bulb. FIG. 5f shows a combination of which areas of the original light source is allowed to impact the vat. The filters incorporated to a projector may number one or more, and many more positions of the filter and other shutter designs are possible, by way of non-limiting example, rotating individual filters as in FIGS. 4a and 4b), a single track of filters in a linear fashion, etc. These filters may also be combined by using two or more to offer a more customized filtration of the light-source than would be available through a single type of filter or colored glass, for example further narrowing the allowed band-gap.

While these are preferred band gaps via filter for the projector and current resin, which are used to attenuate the original light source to preferred spectrums, other solutions exist according to the current invention, such as using a bank or multiple channel LEDs at appropriate wavelengths. This is especially true since LEDs have a number of ranges from 250-500 nm and the bandwidths are very controlled. Further, different resins with varying photo initiators and photo blockers will require different filter ranges. Finally, by addressing individual pixels or groups of pixels within a layer with different filters, for example 365 nm (402), 385 nm (403), 395 nm (601), and 405 nm (602) at separate times, or exposures, the effect can allow for a custom surface roughness as different pixels are cured to different depths, even if these areas are interspersed with one another. (See FIGS. 6a-d.)

Figure 7A:
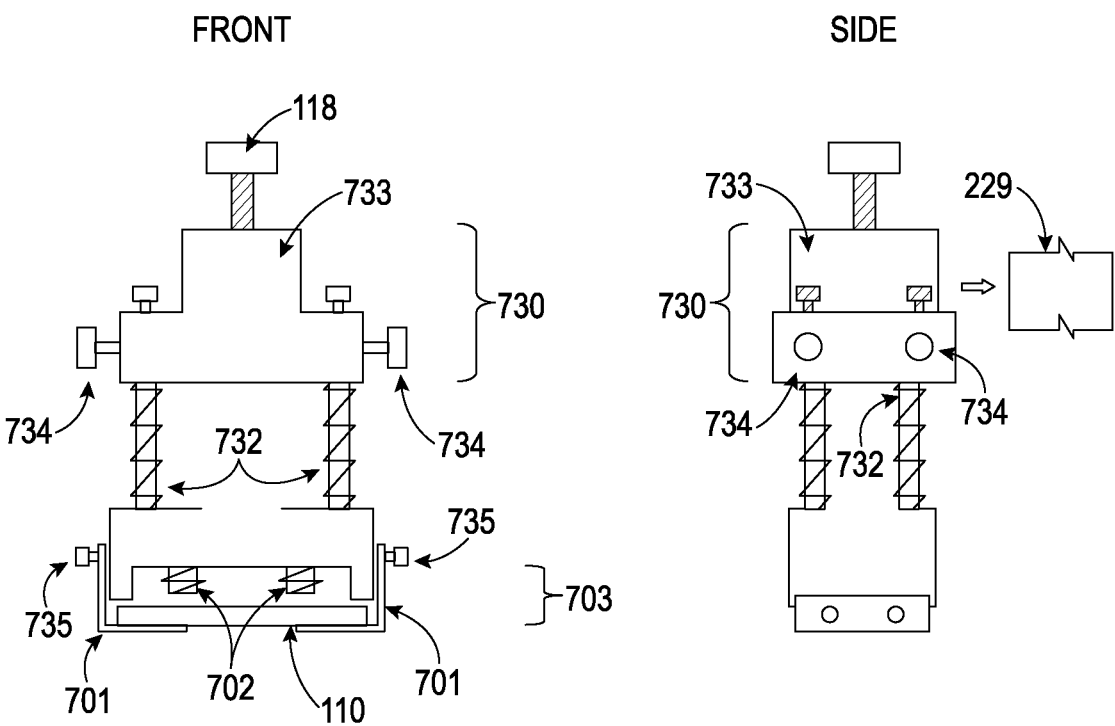
FIG. 7A Chip Clip or Build Plate Attachment, according to embodiments of the current invention.
Figure 7B:
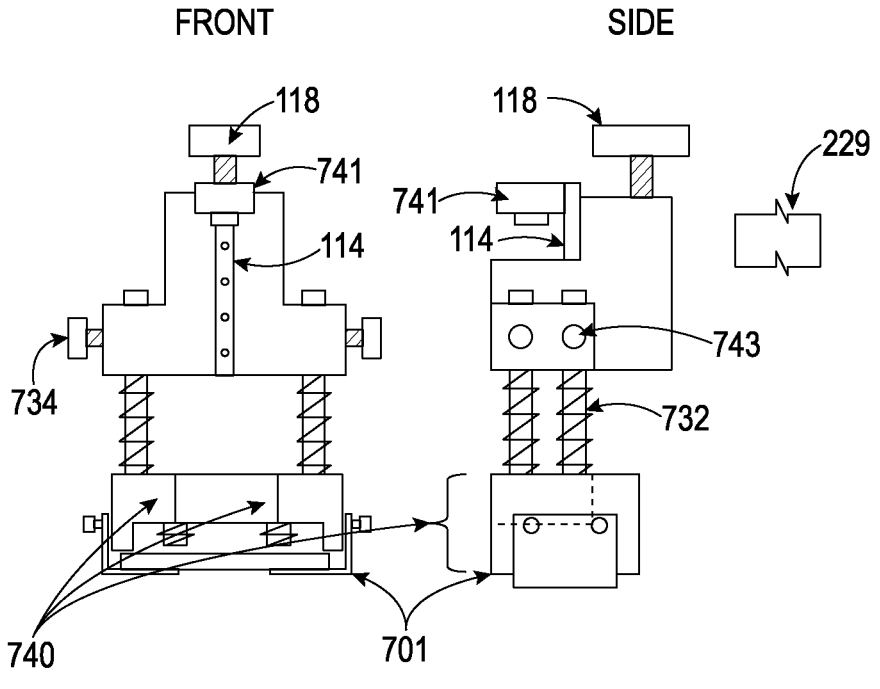
FIG. 7B Chip Clip or Build Plate Attachment with camera, according to embodiments of the current invention.

Chip-Clip™, Elevator, and Printing Substrate:

FIG. 2 shows aspects of the Chip-Clip (109) invention along with a glass slide substrate (110) installed. FIG. 7b shows aspects of the invention in additional detail. The use and speed of a 3D printer for high-throughput microdevice fabrication have been improved by designing and implementing a Chip-Clip™ which can be integrated to the standard elevator on a 3D printer (229). As most microfluidic devices are mounted to glass slides as shown in FIG. 1 (110), this chip clip allows for the installation and location of the glass slide (110) for accurate printing. To install, the elevator with a glass slide is lifted to the appropriate height above the vat and liquid resin within. Next, a glass slide (110) is inserted between the clips (701). The clips hold it securely without the use of other attachment mechanisms other than friction and spring force. The glass slide is located within the clip via springs clamps (702) or by way of non-limiting examples, other flexible guides, ways, printed springs, etc. By way of exemplary notation, the current clips are bent at approximately 90-95 degrees and mounted with screws (735) or another fastener method to cause slight pressure on one side of the slide to push it to a hard and indexed position against the other side. A relief is cut out above the slide to allow operator hand installation/toolless installation. In the current configuration, a second spring (702) is in place directly above the slide and puts pressure to hold it down in the Z direction onto the bent portion of the clips.

The chip clip: A mounting block (733) shown in the picture of FIG. 4b is attached to the elevator of the 3d printer (229) via, in aspects, hand tightened screw via a knob (118) or other fastening methods. The quick release block (733) holds four vertical rods on springs (732). The rods are free moving within the mounting plate guide holes until a second fastening screw or set screw (734) is tightened against them.

In this way, the clip can be lowered to the "zero" position and aligned parallel to the build window with the setscrews (734)loose. The spring activated rods (732) keep the plate level and flat against the build window, the set screws are then tightened, and the chip clip is level and remains so during printing use. This functionality, in a preferred embodiment, is all toolless by design, and can allow for switching out a Chip-Clip™ and leveling a new one in less than 1 minute (by way of example only) from an operator using one hand which is important for fast and agile manufacturing.

The "zero" position is the initial layer position for the first bonding layer. This initial layer is one "layer height" above the top of the vat window. A layer height can be determined by the user in the initial slicing of an STL object. In embodiments, the actual standoff distance when using a clip or mount will be, at minimum, the thickness of the clips (701)which hold the glass slide in place. It is also possible to use suction, adhesive, magnets etc.

According to testing, it was found that 0.25-0.5 mm aluminum or 0.15-0.35 mm Stainless steel can be used and is a preferred embodiment, but other materials may be used for the clips with varying thicknesses up to the ultimate cure thickness allowed by the wavelength used for polymerization and the resin reactivity. According to experimentation, the resin was found to be 1 mm before losing excessive tolerances for XY plane (e.g., vias and holes) beyond 100 um, and if no tolerances are needed for features like vias, holes, pillars, designs, or masking marks, 2.5 mm is the maximum. Therefore, in aspects, the acceptable range of material thickness for the chip clip in practice can be between 0.15 mm and 2.5 mm.

Camera on Chip-Clip™

According to existing art, 3DP programs use a simple call for the camera between layers to take an image so that a set of stills for the print may be placed together in a timelapse video, however, these images and methods currently only exist for the side or sometimes orthogonal view. One of the most active areas of interest for liquid-based 3DP is understanding the correct dosing of a layer as the number of photons affects the strength and percent conversion of the monomer to polymer. This conversion rate has a large effect on downstream biocompatibility. While this is interesting to watch a slow-motion video of a part as it is being printed, it does not add to QA/QC of parts, but the data on the dosage and per layer printed is important for SLA printers that use light to cure each layer.

Until now, Applicant believes that it was impossible to capture any of this information in real-time from a position directly above the area of polymerization. The previous methods for some information use a dosage calibration station located at the side of the 3D printer and off-line, or use an HDMI split cable. Neither of these methods captured the true data in a complete format. Thus, a need for an improvement exists, which is addressed according to the current invention.

FIG. 7b shows the Chip-Clip™ with a cutaway window (740) on the top. In FIG. 7b, a schematic shows where a camera (741)) is mounted above the mounted glass slide (110)enabling images to be taken of the slide and build process at each layer. The current invention allows for the ability to record XY clips of a vat-based printer sequence of all layers. The camera can be remotely triggered to take an image at any point in the build. The camera can be mounted to a linear slide rail (114) to allow focus adjustment as the device height increases. In aspects, the camera can be of the typical low-cost camera modules for Raspberry Pi, such as the Camera Board V2, as this camera module is 8 Megapixels and could then be matched 1:1 with the number of pixels on the 4K. In aspects, this is important for data collection, especially in the case of regulations that may require in-process qc control checks.

To enable a recording or image without distorting or damaging a print, a different bandwidth of light must be used than for the polymerization, otherwise it would either cause polymerization (and eliminate what would be a previously printed channel), be absorbed by the photo blocker and not transmitted to the camera, or a combination of both. In this case, the invention can use a 500 nm cut-on filter with the light source, which allows only 500 nm light and above from the light source to be transmitted beyond the filter (green, yellow, orange, or red and into the IR spectrum). In this example 500 nm would suffice as it is in the visible spectrum and the resin constituents are non-absorbing in the range above 420-450 nm, but different photo-initiators would need different bands. In the case of LED-based printers, an array of LEDs would also suffice in place of a filter. (See also resin constituents below).

A chosen layer may be used to log the information and it is also possible to use an extended exposure, moving the filter into position after the proper curing portion of exposure is complete. The image of the current layer is then recorded as part of QA/QC. It can be logged as part of a run, taken at intervals during the print or print run. It can be used to determine if any pixels are "dead," dim, or inactive during a particular layer and used to trace defects back. This is especially important in the case of gray-scale imaging to determine brightness as computer vision systems can determine more shading than the human eye can detect.

In this way, it is an added benefit of the invention by enabling the computer or 3DP to notify the process operator in real-time if a pixel is not "on" when it should be—or if the issue continued to occur or created a data log of individual pixel brightness over time. With this data made available, the process can be stopped, or a planned maintenance schedule could be enacted to change a bulb/projector. Thus, it can eliminate bad products from entering circulation. Data collection on proper processing for 3D printing is important, especially in a per-layer method. The camera setup according to the current invention offers nearly in-real-time collection. Further, in vat polymerization styles of printing without the current invention this data is nearly impossible to accrue due to each layer not being visible or able to be tracked. The addition of a camera with imaging per layer according to the current invention allows for closed-loop Quality Control (QC) with real time monitoring and analytics.

The current invention utilizes an adjustable camera mounted to an elevator, which can view directly over the printing area and can be focused on the working print area regardless of thickness of the object or position of the layer internal to the final print, as it can capture the XY plane at each layer.

Gantry for Chip-Clip™

Figure 8:
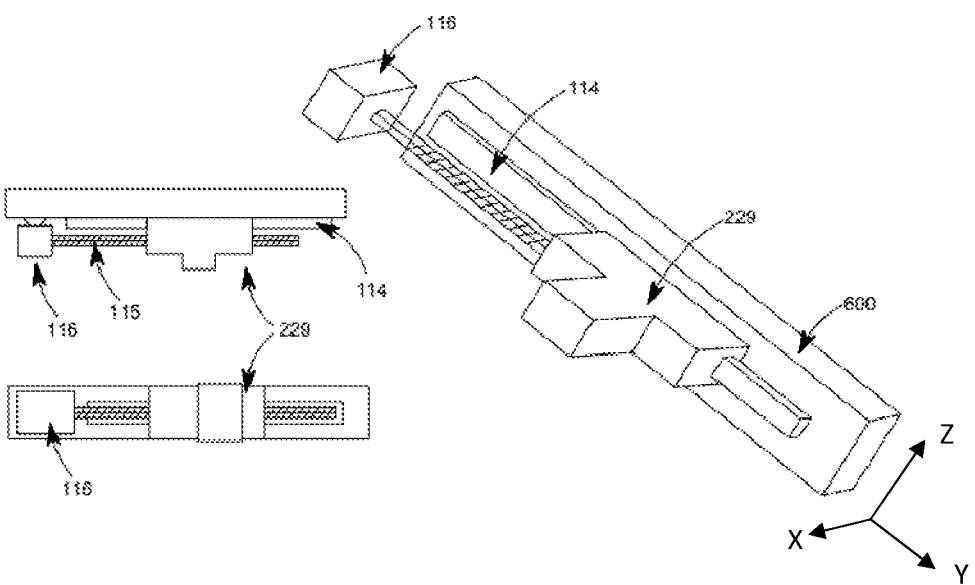
FIG. 8 Chip Clip or Build Plate Gantry, according to embodiments of the current invention.
Figure 9:
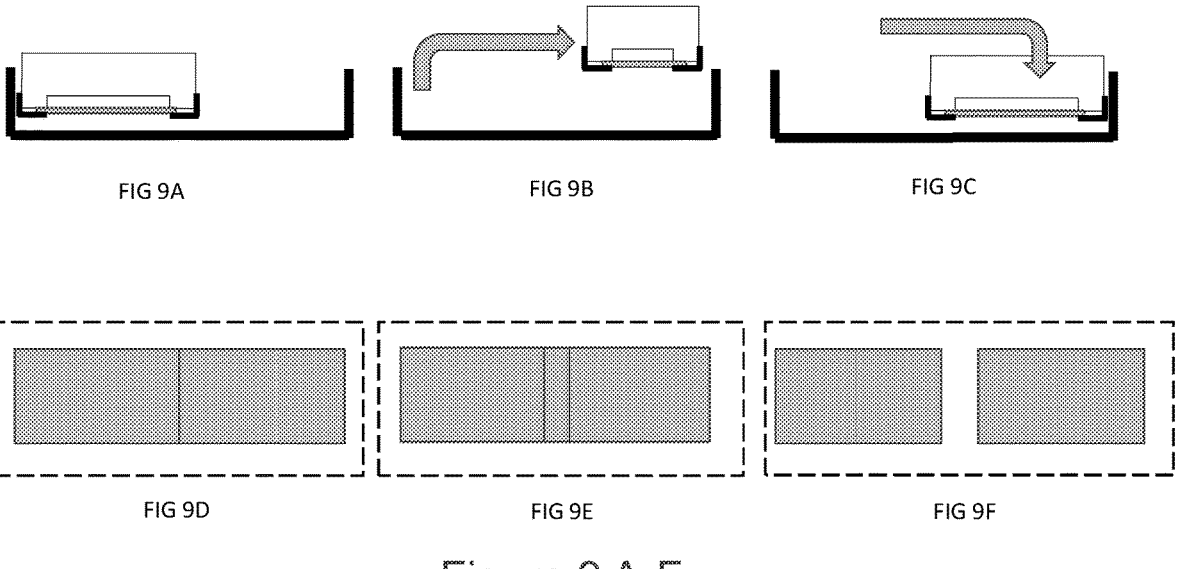
FIG. 9A-F Representation of process to use build plate gantry, according to embodiments of the current invention.

FIG. 8 shows a moveable gantry via micro stepping stage (229) and linear rail (114). This stage allows the motion and precise movement of the Chip-Clip™ over and within the elevator in the Y direction. The movement can allow for one exposure to be printed, and a second one after repositioning the stage can allow the doubling, or more of the printing area This can be important in the case of a 4K projector using a 10-um pixel pitch where the final build area can be 38.4× 21.6 mm. This size can be limiting as many uF devices require 75 mm in at least one axis. With the inventive gantry described herein, the Chip-Clip™ could be moved and double the axis length, for example. Further, it does not restrict the chip clip from one motion and distance. If the pixels were altered to 5 um pitch as described herein, the chip clip can move a preferred distance and still allow for the same overall build platform. In fact, the Chip-Clip™ with properly outfitted gantry motors and linear screw or nano XY stage could move any single distance, even a distance less than one-pixel width. FIG. 9*a-d* shows illustrations of several sequence variations of the gantry and pixel aspect customization. The FIG. 9*a* sequence shows first exposure for the layer is completed, then the chip-clip raises and moves in the Y direction during, followed by the stage dropping to position for the second exposure in the same layer. The motion in the Y direction can be equal to any amount of projector build area; from less than 1 pixel distance (by way of non-limiting examples <1 um, <5 um, or <10 um), to an equal amount of build area (in this example 38.4 mm), to more than the projector area The multiple exposures per layer may take several forms; exposing a portion of a layer image and then moving to display the remaining parts, thus enabling a larger device than possible with one. Or using a similar technique it is also possible to print a replicate (to make multiples of the same object in one print on one stage). Finally it is also conceived that the projector is enabled to only a portion of a pixel width.

Figure 10:
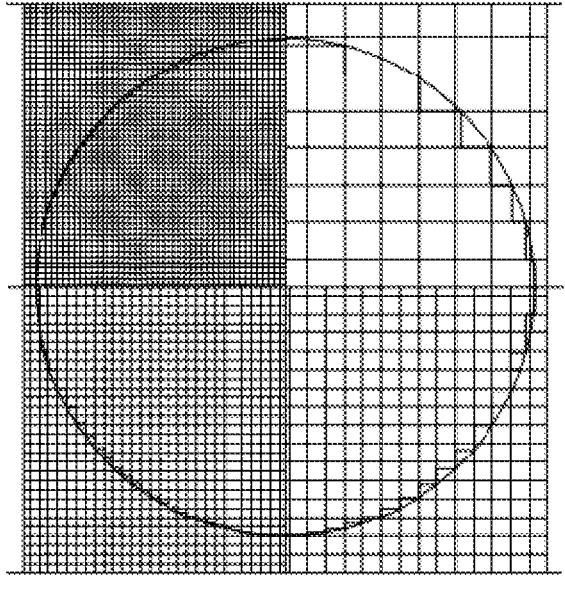
FIG. 10 Different size pixels on a circle, illustrating better resolution, according to embodiments of the current invention.

Optics:

Enhanced Optics and Focusing:

FIG. 10 shows the focus of the optic adjustment has been improved and now uses a series of threaded sleeves to adjust the focus. FIG. 10 shows the focus apparatus and the projector mounted to the frame. The projector can be mounted with linear slides (040), allowing motion in the Z direction and a variety of different focal distances of the optical set (005). This in turn can allow for adjustment of pixel sizes in real-time by numerical control ranging from the Debye limit of light used. FIG. 3*b* shows the focusing apparatus (020), and a set of motors allowing for control of the focus via a zoom motor apparatus (which, in aspects, comprises a stepper motor, linear rail and bearing, and a threaded rod) (015, 016, 018, respectively), and a fine focus motor (022). By moving the projector to a preferred distance between the bottom of the vat in Z, and adjusting both zoom and fine focus, the system can be capable of adjusting pixel pitch at any time during a print, before, during, or after any layer. This can allow for fidelity and control over the pixel size and thus the resolution down to the Debye number (½ wavelength of a particular wavelength) and up. Generally, the most common photo-initiators (PI) which are compatible with biological work, such as printing biocompatible material, exist between the 265 nm to 405 nm band gap; as such the minimal pixel size could be 0.1625 um or 0.0001625 mm. Increasing or lowering this minimal aspect is envisioned.

Pixel Pitch vs Object Detail and Resolution:

FIG. 10 shows a circle in four different quadrants with four different pixel pitches, illustrating there is a need for a high pixel count for precise resolution of objects and proper rendering. FIG. 10 is the result of large pixel pitches (047) combined with small pixel patches (048) to enhance the resolution. The problem for ultra-high resolution 3DP is the reduction in printable area, juxtaposed with smaller pixel aspects, thus the need for a multi-mosaic array in some instances. To one skilled in the art, this figure illustrates the difficulty rendering small objects. The higher the number of pixels placed in a feature, the better the render or tolerance will be. The smallest circle could possibly be rendered with a 3×3 pixel grid, but a 5×5 grid is preferable, a 7×7 more preferred, and so on.

FIG. 11*a-d* is a schematic of various pixel pitches. In FIG. 11*a* the size comparison of pixels between 5 um and 50 um is shown. In FIG. 11*b*, a table lists the total sizes of the build plate resulting from these differences, illustrating the overall build area and the minimum feature size. In FIG. 11*c*, a schematic is representative of the differences in scale for total build area for the various pixel pitches shown, (e.g., 5 um, 10 um, 25 um, and 50 um). In FIG. 11*d*, a table lists the total build area for one DMD exposure of various resolutions (e.g., 2k, 4k, 8k) vs. different pixel pitches. These figures illustrate the problem with high pixel count per unit area —reducing pixel size to attain the needed resolution results in an exceptionally substantial reduction in build size for a 2D object, to the point of limiting use in industry.

Multi-Pixel Pitch:

The resolution of a printer is generally limited to a single pixel aspect (XY) spacing to create or render any object. While there are certain techniques like dimming or grayscale to reduce or expand the cure of objects that are not a direct multiple of pixel spacing, these do not function very well in practice and can only be applied as a global setting per print—they cannot be tuned to individual cases per layer or even segments of a layer. The result is an object not a direct multiple of the given pixel aspect or smaller than a single pixel is at risk for proper tolerance, and for any features that border on this aspect. These factors should be considered as part of the design for additive manufacturing at the earliest stages of concepts and revisited at the time of any revision.

This is burdensome for engineers developing microfluidics and microdevices as the product typically transitions through 5-10 design revisions during their evolution. These design revisions are often the result of initial testing combined with multi-physics programs like COMSOL to ANSYS—and the resulting changes may not always fit the pixel grid. The best-case result is pixel mapping, where features are designed to overlay directly with the pixel grid of the 3D printer. In the case of a channel width equal to a pixel, it should be mapped to the pixel grid. If a channel is between the pixel pitch or not a direct multiple, an operator/ engineer then must either use a narrowing technique such as over curing where the layer is over-exposed and light begins to polymerize into a void, or use a gray-scale technique, or enlarge the channel to a multiple of the pixel aspect (e.g., 50 um×2 pixels=100 um). Unless pixels may be altered during the layer to enable smaller channels to be realized.

Pixel Mapping and the De-Coupled Pixel Grid:

A single pixel pitch per print or per layer is limiting and results in a requirement of pixel mapping; during the design process, aligning features like channels and pillars must be made at the same intervals as the pixel grid. However, according to the current invention, pixel size can be changed before, during, or after printing, including during a layer. By integrating the ability to adjust the pixel aspects and mounting the projector on an XY gantry FIG. 12 and adding a rotation stage (see FIG. 19), the current invention allows for effectively decoupling the printer from any pixel grid and introduces several novel concepts.

Figure 12:
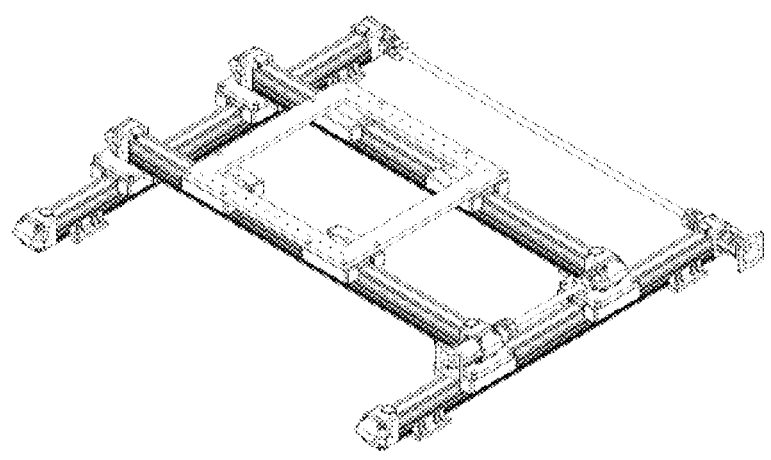
FIG. 12 XY gantry depiction for projector carrier, according to embodiments of the current invention.
Figures 13A, 13B, 13C, 13D, 13E, 13F:
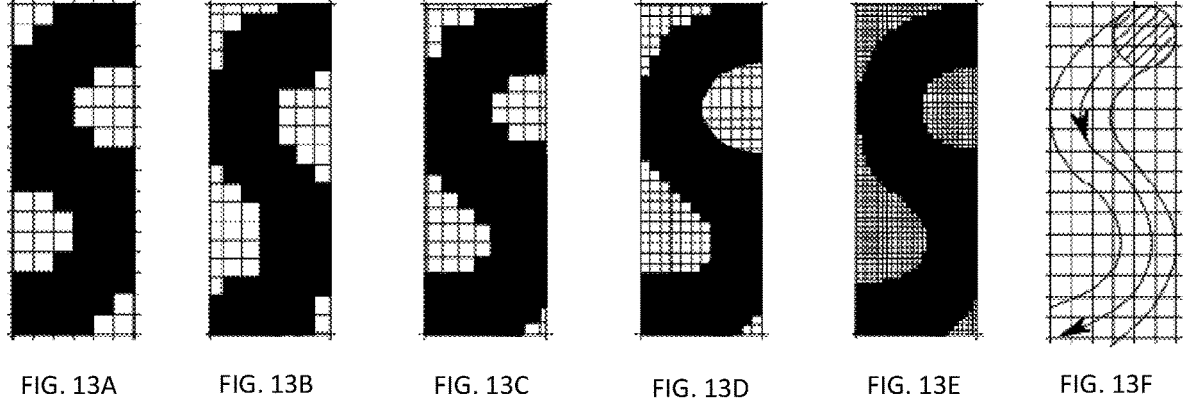
FIG. 13A-F Depiction of pixels for resolution vs SLA-mode for DLP, according to embodiments of the current invention.

Scanning or Trace Mode:

In addition to the above, as shown in FIG. 13A-F, if a single pixel or a group of connected or unconnected shapes forming a specific block of pixels were turned on at one or varying intensities to enact a solid or dimmed/unfocused dot, the gantry for the projector could be used to draw a shape on the exposed layer (FIG. 13F). This means the projector can essentially work as an SLA machine. The pixel group could be directed to several areas and create an array of the same object. Or used instead of a second exposure to trace the leading edge of channel/void transitions. This inventive technique can be applied for creating smooth curves in the structure in the Z direction, in place of 3D anti-aliasing typically used or in addition to shrinking the pixels to smaller levels The shapes could be independent from one another, or connected to each other. Features created can be independent from the pixel map of the DLP/LCD, but also not the same as the SLA—it can be a hybrid design. This would enable smooth lines at the micron level, curves and circles with hollow sections, and the ability to make blocks of these features (for example multiple cylinders created with wall thicknesses at), which is exceedingly difficult to do via LCD/DLP, even with the best dimming resolutions technologies. The gantry example in FIG. 12 is non-limiting, and several examples of gantries exist, including, by way of example: core-XY, Cartesian, polar, and delta It is envisioned that a polar gantry would find particularly beneficial use in the creation of devices similar to CD style microfluidics.

Figures 14A, 14B, 14C, 14D, 14E, 14F:
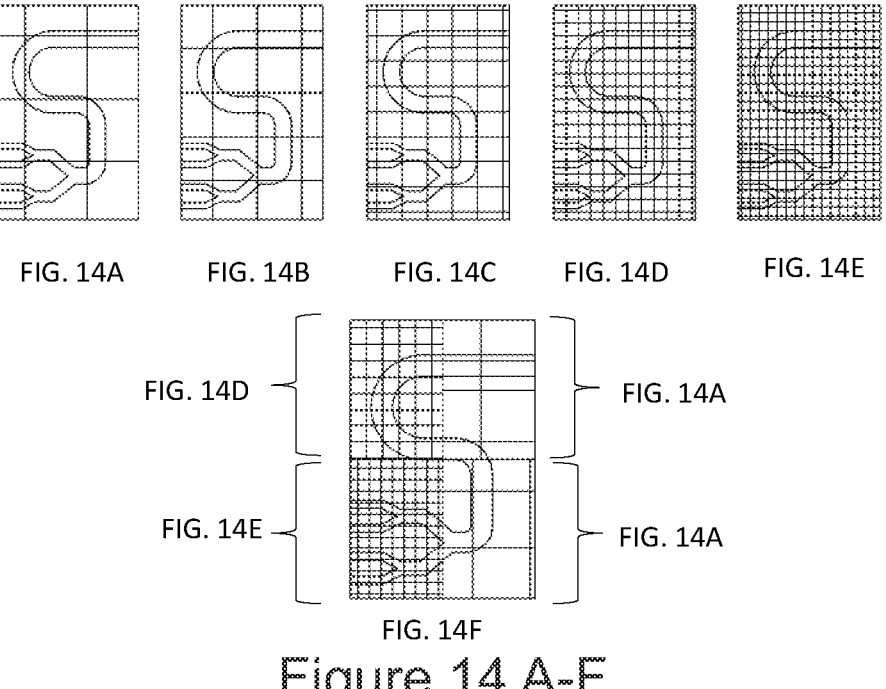
FIG. 14 A-F Microdevice scenarios of circuitous routes and branched or bifurcated channels, according to embodiments of the current invention.

Mosaic and Tiling with Various Pixel Aspect Sizes:

FIGS. 14 *a-f* illustrate a common microdevice scenario of a circuitous route and branched or bifurcated channels which reduces the span of a channel with each split. This presents an issue for high-resolution 3DP DLP because the ultimate size of a build area is directly tied to the DMD x pixel size (e.g., 2K, 4K, 8K). In FIG. 14A some parts of the larger channels may be printed but others will not turn out correctly in the curved sections. FIG. 14E illustrates that all aspects of this layer may be resolved; all aspects of the bifurcated channels and route may be printed. However the cost in FIG. 14E is a very high number of exposures per layer which increases total time to print. FIG. 14F shows that more than one pixel size can be integrated for a given layer. For an exposure, the total area covered is multiplication of the total size of the pixels (e.g., 10 um) by the total array size, e.g., 4K is 3840×2160 pixels in X and Y. In this example, the total area for an exposure would be would be 38.4 mm×21.6 mm. If the size of a print dictates a larger build area, the pixels must be scaled up (say by around 50 um). However, if the features in the layers are too small (e.g., around 60 um width channels in this particular example), they will not be properly resolved, because as taught above, smaller pixels are required to produce detailed features.

According to the current invention, to print small features over a large area, the picture or image slice can be converted into a mosaic of sub-slices. This can be accomplished by software capable of creating sub images or cropped images via scale size (e.g., vector analysis) or pixel count (e.g., raster/bitmap). According to the previous art, in aspects, when this is done, all mosaic tiles are the same size, and all pixels remain the same size for the layer and the print—e.g., 10 ums with 4 exposures. With scalable pixel aspects according to the current invention, this is both not necessary and can take longer to print. By way of a non-limiting example, the preferred pixel can be selected for speed and resolution (e.g., 5 um with 8 exposures), or in the case of only a small area needing high resolution—a single exposure at very high resolution can be displayed while the rest of the layer can be created by one exposure, e.g. 20 um at 2 exposures and 1 at 5 um.

According to the current invention, this can provide for especially useful printers, which can span several measurement factors. From nano to macro, this current system can enable the creation of large (macro) objects centimeters to meters large, along with microscopic features in a much faster production method. As Manufacturing as a Service (MaaS) grows with the Industrial Internet of Things (HOT), the current invention is an improvement over the current art for the microfluidics and lab on a chip industry, currently limited by expensive molds with long lead times.

Taken together, FIGS. 14A-F show that a particular layer or design may be best served by multiple pixel arrays in size. This can occur at many different layers, that one layer may be simple enough to only require one pixel aspect and exposure for the layer, and that an incredibly detailed layer may require more than 2-pixel sizes. Further, as pixel sizes shrink, the intensity and lumens or photons per unit area increase, increasing the dosage per unit time; this affects cure rate and cross-linking of the polymer and should be considered in design and fabrication.

Figures 15A, 15B, 15C:
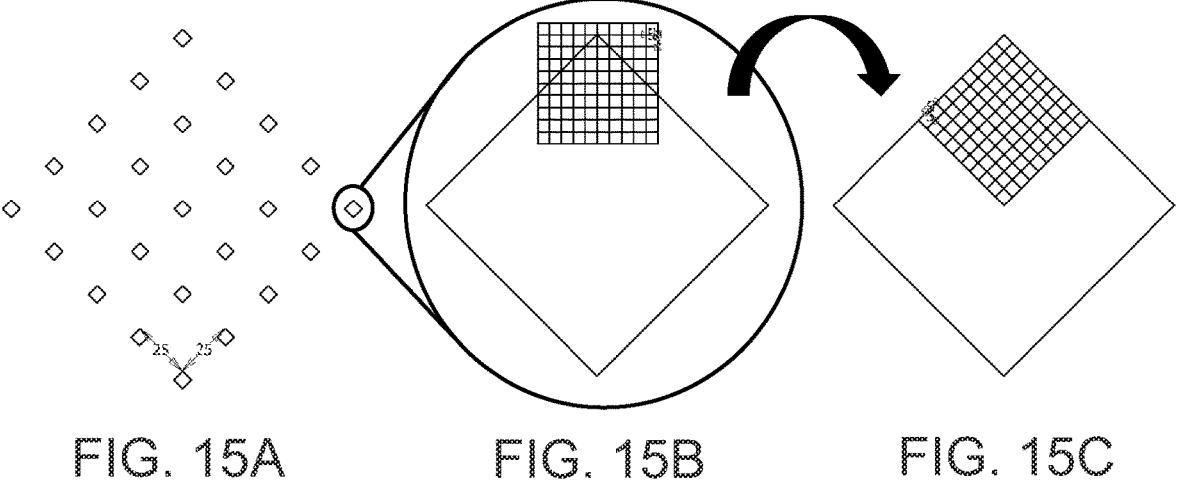
FIG. 15A-C Depictions of rotation pixels for aligned resolution to printed object, according to embodiments of the current invention.

Further, FIGS. 15A-C show that particular designs —such as a diamond pattern used for cell separation (15A) which uses squares turned at 45 degrees to the main axis of the DMD (15B)—and other designs which have non-orthogonal lines may be better served by rotating the projector to this aspect (15C) and printing these features rather than using another strategy like extremely small pixels or grayscale methods to emulate this section. Finally, in aspects, this process is not done in one exposure, therefore these mosaics can have pixels in a variety of sizes, sometimes more than 2 or more than 3, and thus can be printed in any order deemed fastest or otherwise optimum; this can be completed by computer-based decision making. In aspects, an algorithm may be used as a decision maker for the mosaic tiling on a per-layer basis and may be made in real-time or as part of the initial slicing program.

Figures 16A, 16B, 16C:
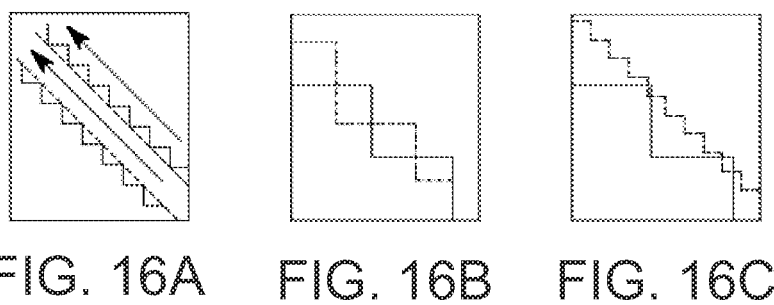
FIG. 16A-C Depictions of resulting resolutions from half, quarter, and motion of single pixel aspects, according to embodiments of the current invention.

Shift: The projector with a well-equipped gantry, XY, with a leadscrew stepper motor and linear rail set may shift the location of the pixel array by a portion of the pixel pitch and use a second exposure or during the exposure (FIG. 16A) to enact the effect of reducing the pixel in half (FIG. 16 B and FIG. 16C), ¼, ⅛, etc. (See FIG. 16). The pixel aspect to remain the same and the projector location relative to the first exposure shifted to allow a percentage of overlap—mimicking and creating for all purposes a smaller pixel than possible on the original optical plane. This is a method by which to replace, enhance, or expand the greyscale methods in previous art.

Figure 17:
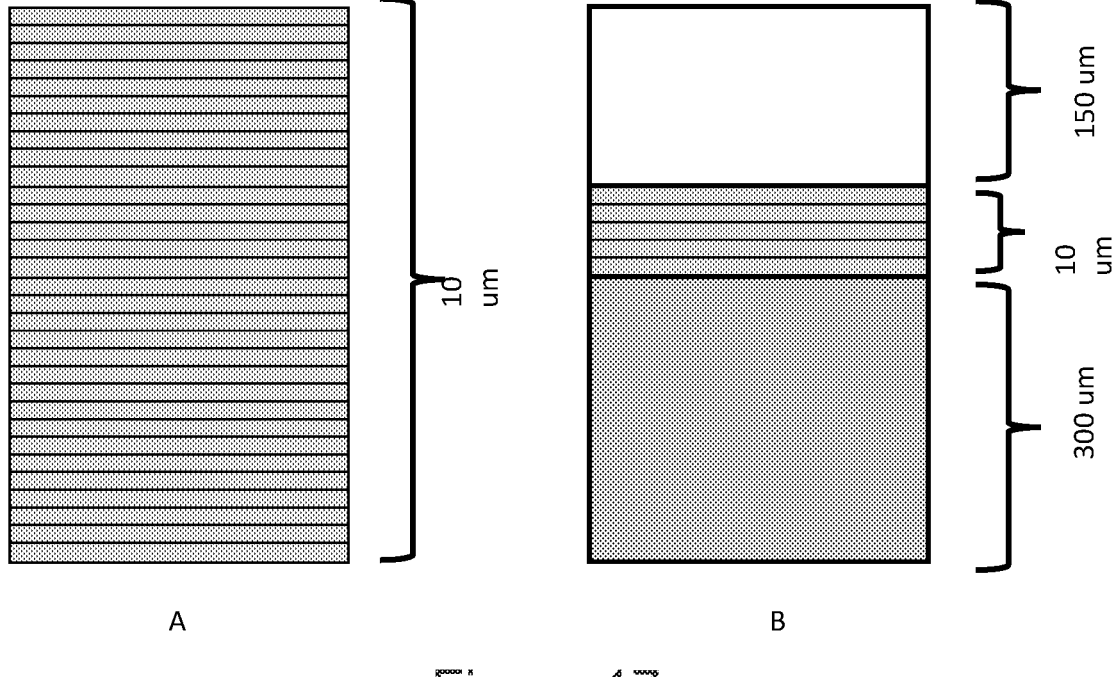
FIG. 17 Multi-layer or Multi Voxel schematic, according to embodiments of the current invention.

Expanding on this aspect of the pixels can also be expanded to print in larger sections more quickly; especially in some layers for uF devices the actual layer has lower tolerance requirements—for example the base layers in many devices are a slab which have no channels. In this case, completing the layer in one exposure—especially if several layers are the same—can have a significant shortening of the total print time. In total this could reduce the number of actual displayed areas per print per layer. For example, in FIG. 17A all 30 layers are 10 um in height, this would take 30 repeats of exposure plus peel motion. However, with different filters it is possible to expand the range of 3D printing resins to 10× (e.g. 2500 um) the penetration of standard light sources and high accuracy resins (e.g., 10-25 um). FIG. 17B shows a scenario of using 3 filters to allow three different tuned heights of 10 um, 150 um and 300 um. This represents a significant reduction in print time as only 6 layers needed to be printed in 17B vs. 30 in 17A. This can also be combined with the "trace" described herein and use an edge of pixels to trace the channel or other feature.

The combination of aspects of the invention described herein, or any aspect used by itself, can allow the completion of high-resolution prints faster. In aspects, a computer algorithm with a decision matrix can be capable of creating a format to derive this method for any print, and any segment of a mosaic or layer within a print, and can be incorporated to the slicing engine of that program, routine, sub-routine etc. FIG. 18 illustrates a decision matrix which can be used according to the invention described herein.

Parts of these algorithms can be used with a different 3DP by placing a gantry for the vat and build elevator on a standard LCD printer or SLA printer, which has the ability to shift in XY at sufficient resolution. This process could be enacted on these printers as a way to retrofit or otherwise improve their functionality. For example, Anycubic Photon, or Phrozen shuffle, or in the case of an SLA printer, FORM Labs, are examples.

Figure 19:
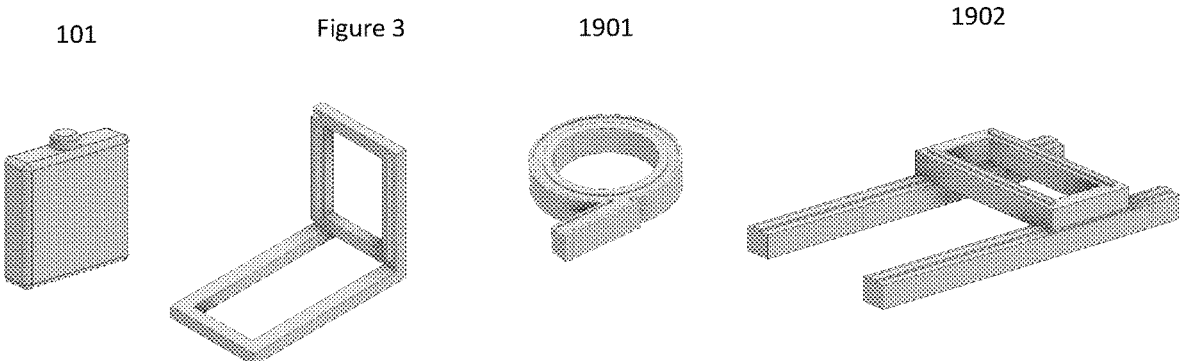
FIG. 19 Rotary stage on XY platform with Z projector motion, according to embodiments of the current invention.

FIG. 19 shows a representative schematic of the projector with focus apparatus, mounted to a standard rotational stage (1901) and then mounted to an XY gantry (1902) with a mounted projector stage. The stage also can have a Z motor (FIG. 3) as well as a focusing apparatus. By using a combination of lead screw pitch and number of steps to the motor stage movement of a few hundred 200 nm can be obtained while the pixel size remains at 10 ums. Piezo stages can reach tenths of nm. This could allow the use of pixel resolution to be still at 10 um (2× pixel size) but enable movements of for example 10 mm-200 um; meaning that the effective pixel size can be stepped at any non-static selected interval chosen within that range. In this non-limiting example, if 200 nm step sizes per layer were selected, the next pixel size up which could be completely rendered would be 10.2 nm features, and stepwise at every 200 nm spacing from there: 10.4 um, 10.6 um, 10.8 um, and so on. This feature size increment is lower than possible for injection molding, hot embossing, and PDMS molds. The resolution of nanometers is at or below the typical threshold for surface roughness for these processes. As well, it approaches resolution for 2PP, which is in the 50-100 nm size range. Further each step could be a different number as determined by operator input for resin or computer algorithm.

Resin:
Filter Based Depth Control Per Resin Constituents:

In microfluidics and other microdevice fabrication needs, one of the most important parameters is the ability to control the cure depth (or light penetration) and understand how to do so. Factors that affect the control of depth are wavelength of incident light (bandwidth), intensity (light Flux, Lumens, or number of photons), the chosen photo-initiator (which when activated initiates the polymerization reaction), the photo blocker (which inhibits the transmission of light at certain wavelengths), and the polymer(s) with other dyes and potentially plasticizers.

The "polymerization band" is the segment of a light spectrum that allows reaction and subsequent polymerization between the incident light, and the resin constituents (e.g., photo-initiator ("PI"), photo blocker ("PB"), and polymers). Within this band, incident light activates the photo-initiator via photon absorption and subsequent bond breaking. This creates a free-radical state, and the charged segment of the initiator seeks to lower its overall charge by linking to a monomer, creating a polymer. This chain reaction can continue until the energy state of the polymer is sufficiently low and further linking to other monomers is terminated. The number of the reactions/broken bonds is proportional to photon Flux, a larger number increases the temperature of the solution (exothermic reaction) until all the catalyst and reactants are exhausted.

A priori, light bandwidth, and the photo-initiator must share some portion for the PI to be activated. There are three interesting and separate scenarios:

1. No overlap of the curing photon source with the photo blocker, which would result in an exceptionally large to infinite cure depth depending on the intensity and extinguishing/absorption rate of the polymer on the bandwidth.

2. Overlap between the PI, PB, and bandwidth ("BW"), which would result in controlled cure depth. This scenario can be experimented with to determine exposure times for a given depth and is the typical scenario for most 3DP resins.

3. Overlap between the PI, PB and Photon source, while the absorption rates of the PI and PB vary in intensity. In this scenario the different absorption rates allow one of these constituents to be the limiting factor between unrestrained cure depth—and very limited cure-depth.

Figure 20:
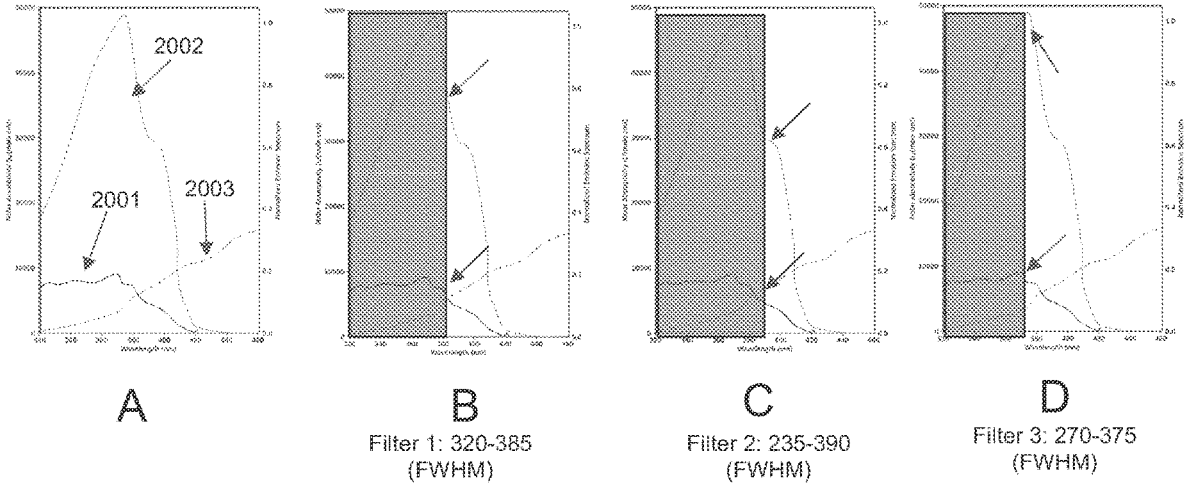
FIG. 20 Resulting interactions between photoinitiator, photoblocker and filter, according to embodiments of the current invention.

FIG. 20 shows several different cure ranges based on filter selection which are of interest for cure depth control.

Regarding the area of the curves between these two states and within the range of the light source (2003), the two curves of BBOT (PB) (2002) and TPO (PI) (2001) have nearly identical maxima at 362 and 372 nm, respectively. As the two curves follow light into the near visible segment of UV, they separate. TPO extinguishes faster than BBOT but still has residual blocking power albeit reduced. What was discovered according to the current invention through significant iterative experiments is that this segment where significant overlay occurs still allows controllable cure depth, and if bandwidths are preferably selected/chosen, different cure depths for a particular filter can be attained which are outside of other filter/bandwidth combinations. This discovery as part of the current invention allows for the accurate curing of different cure depth ranges which have overlaps but not in the complete range. Thus, microchannels are possible at different spectral positions, and different spectral positions can be programmed into a 3D printer program to effect different results than other bands. (See FIGS. 21 and 22 A-J for potential results.)

In previous work in micro polymerization for 3D printing the labs of Fang (MIT), Fouch (UW), and Nordin (BYU), investigated formulas with PEG DA, IGA819, and others. Each lab only used one light band, Fang 395 and possibly 405 LED, and Fouch along with Nordin 385 LED. All the groups used similar PI and PB to one another. Through slight changes in formulation, it seems they arrived at very similar results despite bandgap. As such, the current Applicant investigated several PIs, PBs, and band gaps which span the range from 365 to 405 nm (e.g., 365, 385, 395, 405 nm). Until the current invention, Applicant is not aware of any DLP projector-based system that has been able to produce channels or artifacts at a 10-20 um range.

According to experiments that led to the current invention, it was demonstrated that a standard DLP light projector based 3D printer with proper resin construction and filter selection can readily produce flow channels at and below 100 um within different bandgaps; according to the present invention, this can be expanded to encompass multiple LED channel arrays. LED arrays with more than one bandwidth can be selected (e.g., 325, 365, 385, 395, 405). Further, for additional control over cure depth, the selection of bandgap and mated PB can be governed by the difference in absorption rates of the two. This difference can dictate which filter, or LED, should be selected/used based on the percentage of PB within the monomer, allowing for adjustable cure depth. It is the bandgap photon content (Flux) and percentage of PI with a matched absorption spectrum that can be used to control reaction speed and layer cure depth.

Figure 22:
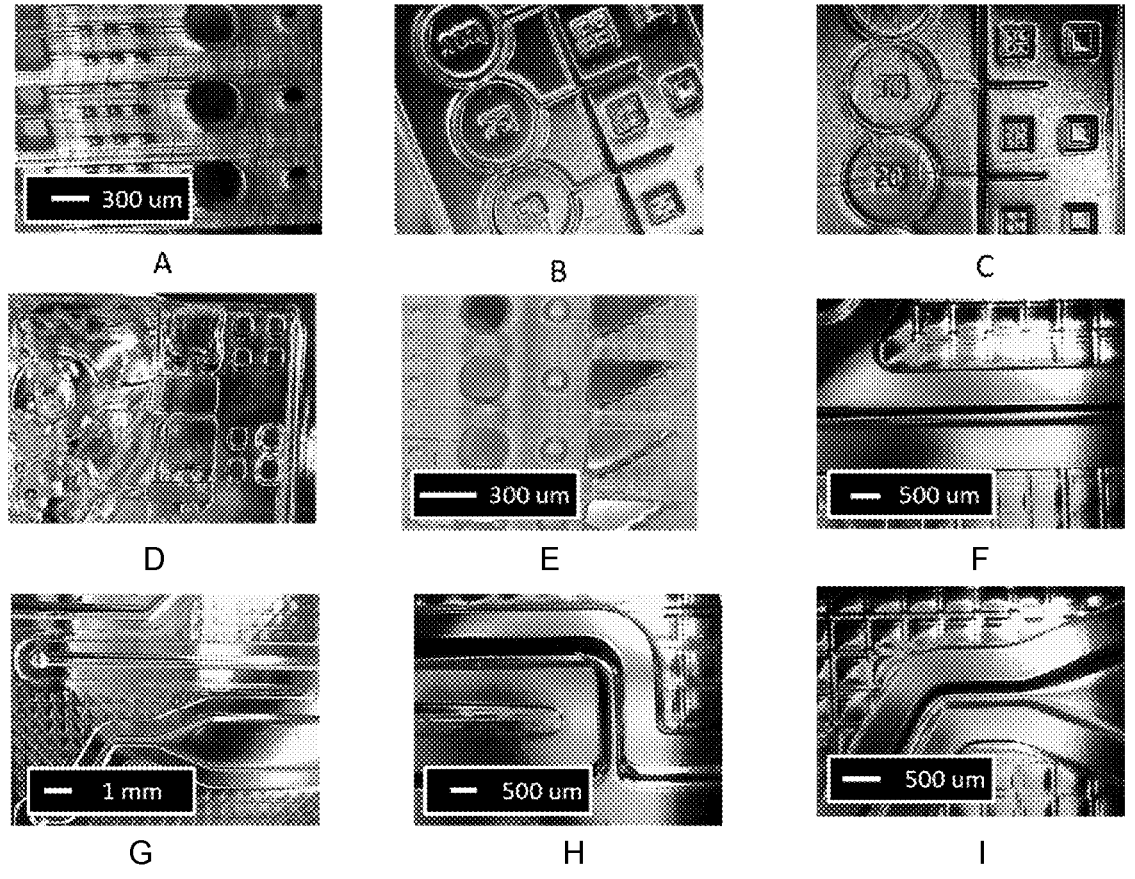
FIG. 22 Microscope imaging of micro channels voids and circular cross channels, according to embodiments of the current invention.
Figure 23:
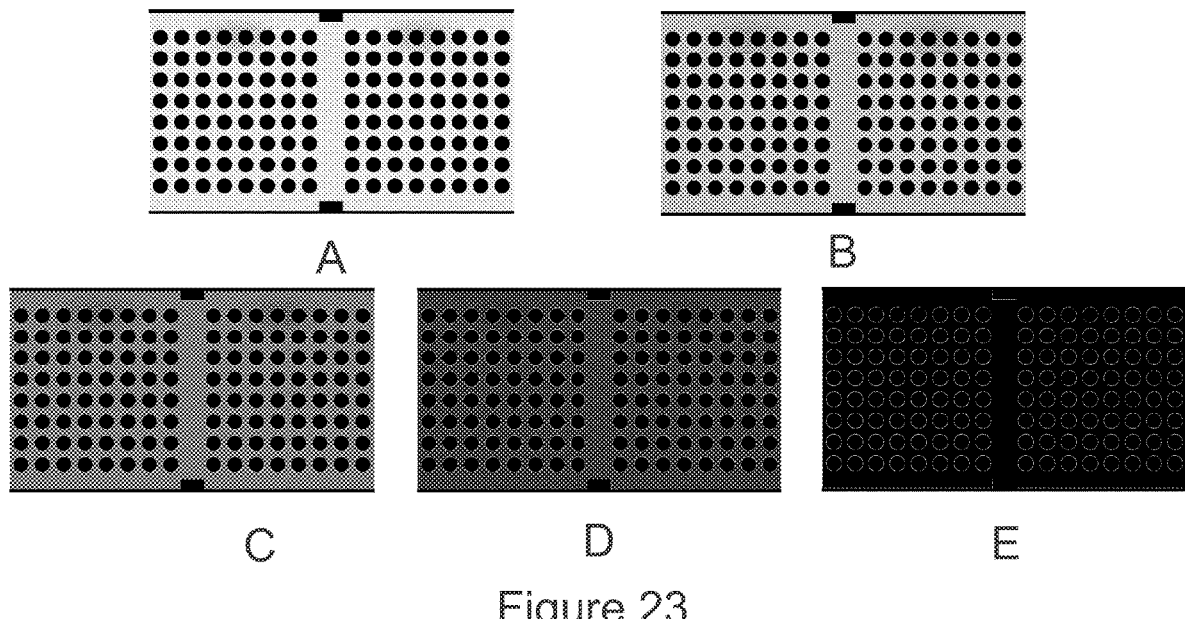
FIG. 23 Shows depictions of flux pass rates, according to embodiments of the current invention.

Custom optics can be used according to the current invention, adding filters that can attenuate the wavelength within the polymerization band and allow preferred penetration and cure depths. In aspects, PEGDA 250 MW can be used as the base monomer. The photo blockers investigated by the Applicant leading to the current invention were BBOT, Tinuvin-400, Tinuvin 477, Tinuvin 384-2, Tinuvin 1130, Avobenzone, and NPS. The photo-initiators used were Igracure 369, Igracure 2925, Igracure 819, and TPO. In examples, Applicant used a 10 um pixel size on the Optima UHD60, which has a 4K DMD, as such the total build space in this case was 38.4×21.6 mm. FIG. 22 shows the measured light spectrum of the Optima HD60 4K projector with a standard bulb. It illustrates that the light spectrum starts in the UV with overlaps on all PI listed above and continues through the UV and into the visible light spectrum. The amount of light at each selected segment (filters from FIGS. 23-25) is the integral of the band gap to the maximal of the spectrum in this range; filters used were 365, 385, 395, and 405. Their flux pass rates are provided in FIGS. 23-25. As each filter is not 100% pass rate, the flux is reduced across the selected band gap. As part of this unpredictable art, surprising success underlying at least in part the current invention described herein, was reached when there was a high enough flux and absorption overlap to solidify the chosen resins at 365 (051), 385 (052), 395 (053), and 405 (054) nm.

Figure 21:
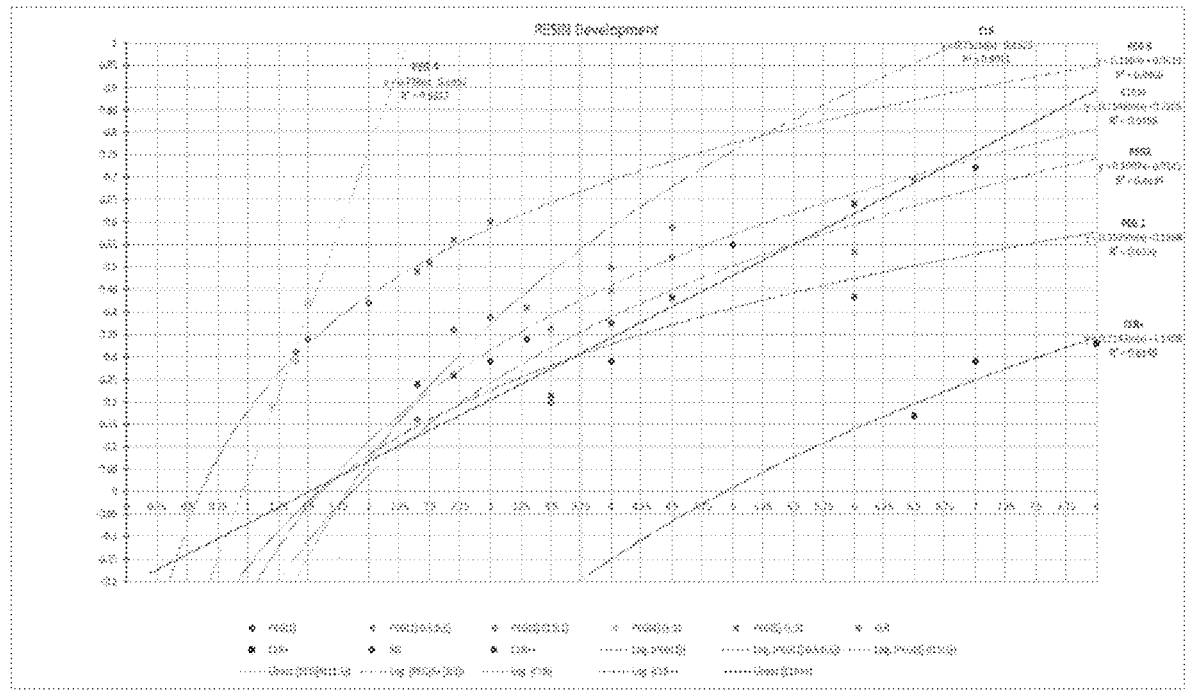
FIG. 21 Cure depth vs. speed for multiple resins and filters, according to embodiments of the current invention.

Experiments showed that even with extended times of exposure, into the 10s of minutes, the filtered light which coincides with different parts of the molar absorptivity in curves of PI and absorber result in different thicknesses of layers which can be polymerized. The results for filter 385 and BBOT/TPO are exemplary of tunability as compared to 405 nm. The experiments explained herein are more comprehensive and provide a deeper understanding of the resin and how each constituent performs differently when others are also a factor in the experiments. This is useful in several 3DP scenarios to reduce the time of a print while attaining a high degree of accuracy for micro-features (FIG. 22A-J). FIG. 21 shows a graph with different compositions of resin—illustrating control over the depth and time for cure including below 20 um.

The results of experiments with absorption from blockers, initiators, exposure times, dimming of edge band pixels, overall channel height, and light sources, is demonstrated in FIGS. 22A-J, showing microscopy images of crossflow channels. The Figures further show that choosing different bandwidths of light source does indeed change the cure-depth regardless of exposure time while maintaining that a cure depth is an exponential decay function and follows the Beer-Lambert Law. It was theorized by the Applicant according to the current invention that this could be explained by intensity or dosage—so several experiments were run into the 10, 15 and 25 minutes range. In aspects, there were no further depth penetrations beyond the shown graphs.

As such there is an issue with systems which use single LED curing arrays with a PI and PB which completely overlap. In such cases, there can be no further curing of the layer after initial layering; in other words, the light which is needed to cure cannot penetrate further than a certain distance regardless of how long it is exposed for. Therefore, single LED methods only remain at a green-state cure. This presents a problem as PIs are known to be toxic to target cells and leach out into the channels. As such, this system of a PI and PB have decreasing distance between absorption curves on one end of the curve may be cured to a final state after initial polymerization.

Figure 5A:
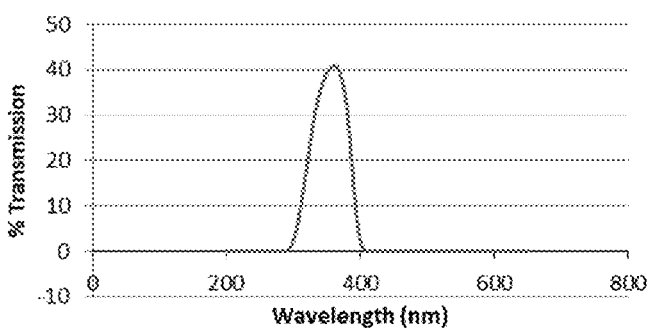
FIG. 5A-C Filter ranges used for 3D printing improvements, according to embodiments of the current invention.
Figure 5B:
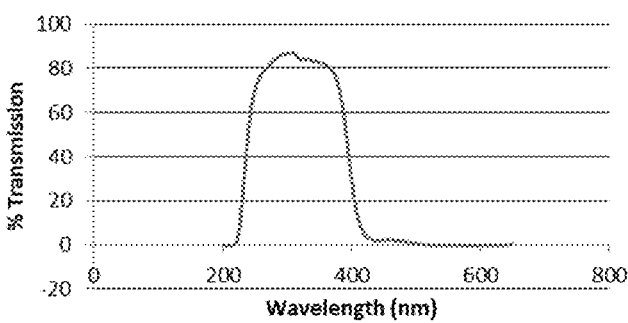
Figure 5C:
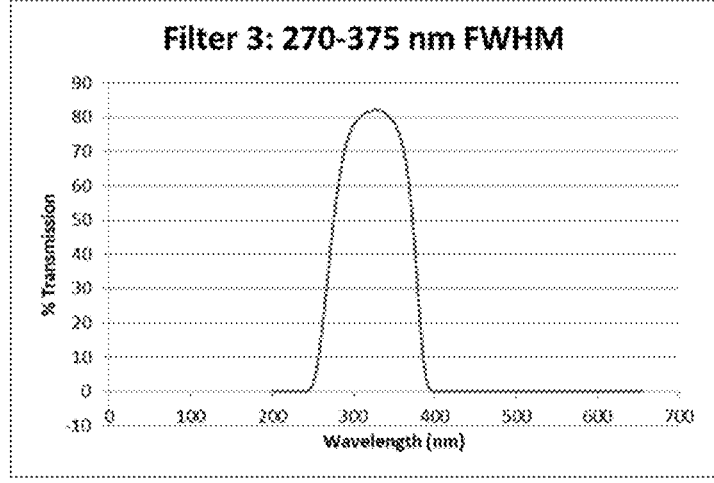
Figure 5D:
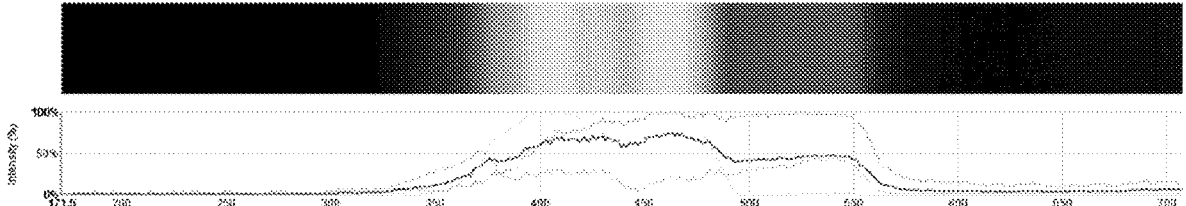
FIG. 5 D Originating light source from projector bulb, according to embodiments of the current invention.
Figure 5:
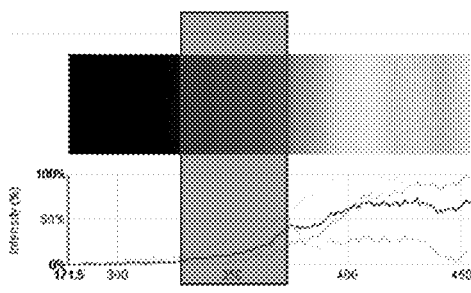
Figure 5:
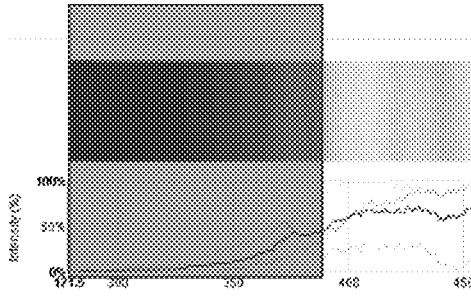
Figure 5:
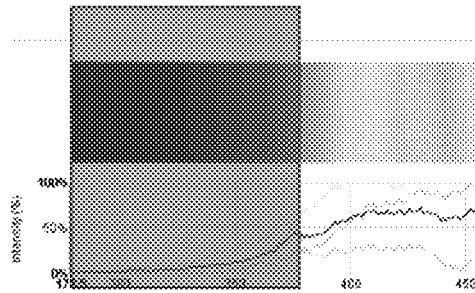
Figures 6A, 6B, 6C, 6D:
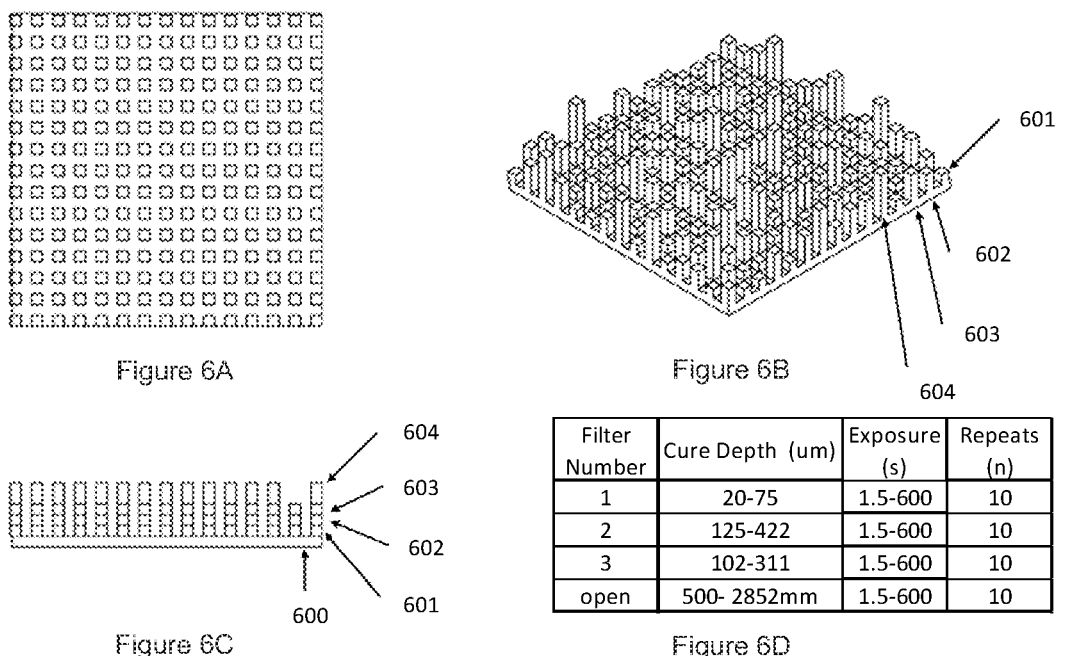
FIG. 6 A-D Pixelated surface roughness schematics and table, according to embodiments of the current invention.

For example, generally speaking, 365 cannot cure light to the same depth as 405, regardless of allowing it to be on for minutes—the initial cure of 100 um takes as little as 3 seconds. This is further illustrated in the experiments depicted in FIG. 21. The curves of exposure times vs. cure depth in FIG. 21 allowed Applicant during experiments to calculate the settings for the above. This shows that selecting a bandwidth based on the difference in molar absorptivity between the PI and PB allows predictive cure depth based on user preference. To illustrate this more completely please review FIG. 5 E-G, which shows the light spectrum of the mercury battery overlaid with curves from the filters and notations of cure depth for each.

At least part of the novelty according to the current invention is that the spectrum of the light source Hg-bulb is not completely contained within the bounds of the photo blocker, such as situations which use single channel LED light banks. In aspects, nor does the current invention use the second set of PI. But, according to the present invention, by selecting different filters to tune the light source to selective bandwidths and having different exposure times and slicing heights, the resulting solid form is different from what can be obtained from a single LED channel. In addition, according to the present invention, it is the tunable depth of cure on a per layer which enables some devices to be printed at all, as without this advancement complete conversion of resin constituents would not be possible with a single PI, nor would it be able to actually print the device and have the initial layers bond to the substrate. Further, according to the present invention, two filters could be used on one layer with different patterns in the exposures allowing different cure depths in controlled and programmed areas. According to the present invention, a projector with a bank of LEDs or a bulb-style projector with auxiliary LED bulbs is also possible.

Dimming Algorithms:

Applicant also experimented with dimming pixels for fine tuning the resin curing rate between bulk solid, void, and transition layers (1-5 pixels from the edge of a solid/void). Previous art required two separate exposures to obtain the same results. In many of the current LCD printers, the dimming is done on the exterior of the illuminated object, which can change the tolerances significantly.

The basis for this solution of the current invention is from two points: 1. Tolerances at this level of precision are extremely difficult to adhere to. 2. It is documented that larger objects in a layer take a shorter time to cure than smaller ones. 3. The interior of larger objects may cure faster than the edge as it has surrounding neighbor pixels which are illuminated.

There are several novel attributes this approach allows. Images of the settings and resulting PNG files can be seen in FIG. 23A-E, which documents the difference between non-dimmed (a) and dimmed at 4 pixels wrap at 10% (A), 25% (B), 35% (C), 75% (D) and 90% (E) with a homogenous dimming on the infill.

This reduces the number of exposures used for a given uF device height, shortening the time needed for a total print.

All objects regardless of the exposed area can be tuned to have the same cross-linking conversion rate or can be custom tuned to have lower areas for better adhesion and bonding to subsequent layers. This is true for most resins tested between 20% and 45%. In aspects, lower than 20% does not cure fast enough, and greater than 45% begins to have effects on green-cure stability and survival for the next layer.

Different patterns akin to infill in FDM, (such as concentric, hatched, hexagonal, checkerboard, etc.), the frequency of the pixel bands (e.g., 2, 10, 100 um), and dimming rates if above 55% on the interior of layers, can result in a customized surface roughness based on exposure time, pixel activation, and dimming percentage outside of definitive programming in the original CAD model. This can allow for micro and nano surface texturing to be rougher within channels than can be attained with a standard single setting layer. In the case of passive mixers, one of the main modules or requirements in designing a microfluidic device is to integrate two liquids quickly, as this process can enhance the mixer.

These patterns can be activated on a per-layer and per-mosaic basis and can be programmed via an algorithm. For example, if a channel is to be formed with a higher roughness in one area, a look ahead comparison via python code can detect the area on the current print layer which will become the channel top by comparing it to the next layer. It then creates the selected pattern at the selected dimming percentage and exposes only that area for that dimming pattern leaving the rest of the layer to be cured at a different level of dimming. This algorithm can be pre-programmed into the "resin recipe" or "resin profile" or slicing algorithm and thus create several customized profiles for each resin depending on the surface roughness required.

Herein, in embodiments, we describe how a single print may be printed faster and with more precision than previously allowed.

Custom tailoring of initial layers for bonding is also one of the issues facing printing devices for low post-processing and direct use. The initial bonding to develop an attachment to the substrate or build plate, in this case, a salinized glass slide, is difficult and usually these layers are overexposed. In the current state of the art initial layers are over-exposed to create a strong bond. This causes a problem in that the longer exposures cause bleeding at the edges of the model and the spreading of resin which is polymerized. This is termed "elephant foot" because it looks like an elephant standing on its footpad which expands under its weight. In the case of uF which typically use one or more of top or bottom of a device, this causes a device to have issues outside of tolerances.

According to the current invention, in embodiments, further compromising the current set up, is the use of the Chip-Clip™ slides. They are 350 um in thickness, and high-resolution resin does not penetrate deeper than 100 um with the filter in the range of 365-385; to penetrate that deep the 405 nm filter should be used. To correct this, the current Applicant investigated through research and development a vast number of settings for the initial layers and found that by dimming the initial edges to the layer by 35% or more of at least 2 pixels, by way of example, several novel inventive aspects were able to be achieved.

Polymerize the first 35 layers in one exposure (reducing the overall time of a print and adhering the device to the slide);

Polymerize the second set of 35 layers using the same settings except reducing the exposure time as this section is being attached to the previous layer which is polymer; and/or Use dimming on the outer edges of the first layer and maintain tolerances.

Current Applicant furthered this technique by using a second filter for transition layers, from 70-100, by way of example. In this segment, Applicant through testing reduced the number of pixels being used by the burn-in layers, and the thickness is reduced to 100 using the same filter. These layers are exposed to a time slightly less than the previous layers, in aspects. This accomplishes several items:

Polymerize the several sets of 10-layer segments with the same filter setting except reduce the exposure time as this section is being attached to the previous layer which is polymer; and Maintain tolerances for the final transition of 300 um.

While this technique cannot be used in every layer to skip portions of a device, it can be programmed into the slicing engine which would recognize when to use this technique or patterns and have a library look-up exposure/filter combinations to use as it compares areas of several layers. In the subsequent layers, which can termed "normal," an algorithm can be used which maintains the exterior walls at a higher brightness while keeping the interior dim. This allows even curing on the process per layer.

In total, the process reduces the time for the device to be printed. It shows that this technique can reduce the print time by, for example, 30% over standard printing techniques, or 10%, 20%, 40%, 50% over stand techniques, and so on. Together with the chip clip motion time savings, this reduces the time significantly; for example, the new method can be 4-10× faster, or 2× faster, 3× faster, 11× faster, 12× faster, and so on. This introduces several new techniques:

Exposures can happen in a single layer with the results and crosslinking being tuned within that one exposure vs. multiple exposures/previous art, which required double exposures for the same result.

Two exposures can be used with different wavelengths for each exposure resulting in a higher fidelity of cross-linking and light-bleed, which has the effect of enlarging the walls or lowering the ceiling of a layer, independent of the "layer slice height."

3D cross linking through the entire device after green-cure can be possible; Applicant is not aware of this being possible in the prior art because the through cure is not possible. In the prior art, the PB prevents the light spectrum which would polymerize the resin to final cure. As a result, only the exterior of the device can be moved beyond a green-state cure. The implications of this are great, as the PI and PB are known to leach into the interior fluids and can cause cell death and erroneous results.

By using a final cure exposure, the subtractive result of all layers, a final cure can be accomplished with targeted light while the device is still on the platform rather than a global light cure in a box after the device is cleaned. This removes a significant process step and reduces time.

The above scenarios can be programmed into a slicer and be automatically updated based on layer differences such as total area, area difference, and/or number of layers equal. (See FIG. 18)

FIG. 22 illustrates the 3D Printing techniques combined from the above processes and used in proper order, by way of an example.

The current invention includes several Aspects:

Aspect 1. A method of three-dimensionally ("3D") printing, comprising:

a providing one or more resin comprising at least one of one or more photoinitiator, one or more photo blocker, one or more monomer, one or more oligomer, one or more plasticizer, or one or more dye;

b. providing projector having a light source;

c. constructing a 3D printed structure by 3D printing one layer at a time;

d. curing each layer of the 3D printed structure using the light source; and e. providing a bandpass filter between the light source and the resin that allows a chosen segment of a spectrum of the light source to polymerize the resin, which allows for control over the cure depth and thickness of a layer of the 3D structure.

Aspect 2. The method of three-dimensionally ("3D") printing of Aspect 1, further comprising:

providing at least two bandpass filters, a first bandpass filter and a second bandpass filter; and using the first bandpass filter for curing a first layer of the 3D printed structure and the second bandpass filter for curing a second layer of the 3D printed structure, wherein using the two different bandpass filters causes the first layer to have a first cure depth, cure rate, dose rate, or combinations thereof, and the second layer to have a second cure depth, cure rate, dose rate, or combinations thereof, such that the first layer has a first thickness and the second layer has a second thickness.

Aspect 3. The method of three-dimensionally ("3D") printing of Aspect 1, further comprising: changing one or more pixel pitch between two or more exposures from the light source, such that a first cure rate from a first exposure differs from a second cure rate of the second exposure.

Aspect 4. The method of three-dimensionally ("3D") printing of Aspect 1, wherein the filter is located in or on a shutter.

Aspect 5. The method of three-dimensionally ("3D") printing of Aspect 1, wherein the light from the light source has a spectrum of wavelengths wide enough to reach beyond the absorption spectrum of the resin.

Aspect 6. The method of three-dimensionally ("3D") printing of Aspect 1, wherein the photo blocker and the photoinitiator have different absorption levels at different wavelengths of the light from the light source.

Aspect 7. The method of three-dimensionally ("3D") printing of Aspect 1, wherein absorption levels of the photo blocker and the photoinitiator partially overlap.

Aspect 8. The method of three-dimensionally ("3D") printing of Aspect 1, wherein both the one or more photo blocker and the one or more photoinitiator do not interact with the chosen segment of the spectrum of the light source, thereby allowing the light from the light source to penetrate the 3D printed structure without causing any curing and reach a camera Aspect 9. The method of three-dimensionally ("3D") printing of Aspect 8, wherein the camera records images of exposures of a plurality of layers of the 3D printed structure.

Aspect 10. The method of three-dimensionally ("3D") printing of Aspect 8, wherein the camera is connected to a computer processor with logs and/or analyzes at least one of cure rate, dose rate, polymerization, or cross-linking.

Aspect 11. The method of three-dimensionally ("3D") printing of Aspect 1, wherein the one or more photo blocker, the bandpass filter, and the light sources, provide for a controlled method of polymerization such that cure depths can be selected to fall between at least one of 1-25 um, 20-75 um, 65-150 um, 130-350 um, 300-500 um, 250-1000 um, and 500 um-2500 um.

Aspect 12. The method of three-dimensionally ("3D") printing of Aspect 1, further comprising providing a computer processing unit and a slicing software program to control at least one of whether a bandpass filter should be used, which bandpass filter should be used, whether a bandpass filter should not be used, or how many layers are printed during a single exposure.

Aspect 13. The method of three-dimensionally ("3D") printing of Aspect 1, further comprising a computer processing unit providing a decision matrix program to control a slicing engine for deciding pixel size, location of the projector, overlap from one position of the pixel array to the next within a mosaic layer, designing a mosaic framework for a layer, or to achieve a preferred speed or preferred crosslinking of the 3D printed structure.

Aspect 14. The method of three-dimensionally ("3D") printing of Aspect 1, wherein the 3D printed structure is a microfluidic device comprising at least one of internally-located channels, pillars, inlets, or outlets.

Aspect 15. The method of three-dimensionally ("3D") printing of Aspect 14, wherein a cross-section of the at least one of the internally-located channels, pillars, inlets, or outlets, are circular or ovular in shape, and are below 300 microns in diameter.

Aspect 16. The method of three-dimensionally ("3D") printing of Aspect 1, further comprising switching from a first bandpass filter to a second bandpass filter during printing of a single layer to create a texture or roughness to a surface of the single layer, wherein the 3D printed structure is a microfluidic device, and wherein the texture or roughness improves passive mixing of fluids, cells, particles, chemical, reagents, or combinations thereof, to be used in the microfluidic device.

Aspect 17. A three-dimensional ("3D") printing system comprising:

a a resin for curing and creating layers for the layer-by-layer 3D printing process;

b. a light source projector, wherein the light source projector is attached to a gantry;

c. the gantry, which is moveable towards and away from the resin in a Z plane, and which is moveable in an X-Y plane for printing patterned layers; and d. wherein moving the UV light source towards and away from the resin along with moving the UV light source in the X-Y plane allows for printing different pixel sizes at different areas within a single layer of the layer-by-layer 3D printing process, such that a layer of the layers for the layer-by-layer 3D printing process is printed having different pixel sizes at different areas within the same layer.

Aspect 18. The three-dimensional ("3D") printing system of Aspect 17, further comprising a linear activation mechanism for controlling the gantry, wherein the linear activation mechanism comprises at least one of a lead-screw, a stepper-motor, one or more linear rail, a linear rail, a nano-stage, or a single axis stage.

Aspect 19. A three-dimensional ("3D") printing apparatus comprising:

a a build deck allowing for loading and unloading of a printing surface for 3D printing of an object or device;

b. one or more clip having a thickness ranging from 0.15 mm to 0.5 mm;

c. one or more spring for at least one of spring-activated locating of the printing surface, allowing for a repeatable location of the printing surface, spring-activated leveling of the build deck, spring-activated locking of the printing surface and the build deck, or spring-activated removal of the object or the device being 3D printed without having to remove the build deck; and d. one or more gantry located between an elevator and the build deck, wherein the one or more gantry has at least one axis of motion.

Aspect 20. The three-dimensional ("3D") printing apparatus of Aspect 19, wherein the 3D printing apparatus prints the object or the device within a range of resolution between 0.2 um and 50 um.

Aspect 21. A method of projector autofocus in three-dimensional printing providing for multiple pixel pitch and multiple mosaic layering, the method comprising:

a) providing a projector comprising a projector lens, wherein the projector is attached to one or more Z axis gantry;

b) automatically focusing of the projector lens for pixels between 0.1 um and 100 um;

c) providing at least one of a stepper motor or a servo motor that interfaces with the one or more Z axis gantry;

d) providing at least one of a bevel, a spur gears, set of screws, a hollow screw-set or a belt, or a linear activator, to activate the automatically focusing of the projector lens;

e) using a linear rail to adjust a zoom of the projector lens;

f) moving the projector as oriented relative to a vat window or a resin surface within a range between a first position wherein the projector lens is in contact with the bottom of the vat window or the resin surface and a second position 1 meter lower relative to the vat window or resin surface;

g) allowing for adjusting the first position or the second position of the projector lens during operation of a three-dimensional printing process.

Aspect 22. The method of Aspect 21, further comprising providing a computer processing unit, wherein the computer processing unit controls the location of the projector as oriented relative to the vat window or the resin surface within the range from the first position to the second position.

Aspect 23. A shutter for a three-dimensional ("3D") printing apparatus comprising at least one filter and a light source from a projector;

wherein the shutter has two or more positions;

wherein a first position of the two or more positions applies a filter to the light source;

wherein a second position of the two or more positions applies a second filter to the light source, or wherein the second position blocks the light source or allows light from the light source to freely pass; and wherein the shutter uses a first shutter position for a first exposure and uses a second shutter position for a second exposure, wherein the second exposure can be one of the same as the first exposure, different than the first exposure, or polymerize the same or similar pixels or voxels as the first exposure.

Aspect 24. The shutter for a three-dimensional ("3D") printing apparatus of Aspect 23, wherein a first position of the at least two or more positions apply a first filter during a first layer of 3D printing and a second position of the at least two or more positions applies a second filter during a second layer of 3D printing.

Aspect 25. The shutter for a three-dimensional ("3D") printing apparatus of Aspect 23, wherein two positions of the at least two or more positions use two different filters for a same layer.

Aspect 26. The shutter for a three-dimensional ("3D") printing apparatus of Aspect 23, wherein changing between the at least two or more positions causes a change in a surface roughness of an internal cavity of the object being 3D printed.

Aspect 27. The shutter for a three-dimensional ("3D") printing apparatus of Aspect 23, further comprising a computer processor having a CAD drawing setting, resin profile, or slicing setting, including a texture or roughness level, which selects the texture or roughness level and applies the texture or roughness level to internal surfaces of the object being 3D printed.

Aspect 28. The shutter for a three-dimensional ("3D") printing apparatus of Aspect 23, wherein the shutter is servo-controlled.

Aspect 29. The shutter for a three-dimensional ("3D") printing apparatus of Aspect 23, wherein the at least one filter comprises at least one of colored glass, a bandpass filter, or an optical filter.

Embodiments of the invention also include a computer readable medium comprising one or more computer files comprising a set of computer-executable instructions for performing one or more of the calculations, steps, processes, and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e., processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may include a graphical user interface (GUI) which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

As used herein, the term "about" refers to plus or minus 5 units (e.g., percentage) of the stated value.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

As used herein, the term "substantial" and "substantially" refers to what is easily recognizable to one of ordinary skill in the art.

It is to be understood that the phraseology and terminology employed herein is not to be construed as limiting and are for descriptive purpose only.

It is to be understood that while certain of the illustrations and figure may be close to the right scale, most of the illustrations and figures are not intended to be of the correct scale.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

The invention claimed is:

1. A three-dimensional ("3D") printing system comprising:

a resin for curing and creating layers for a layer-by-layer 3D printing process;

a light source projector comprising a light source, the light source including a wide-spectrum light source, a multi-LED array, or both, wherein the light source projector is attached to a gantry;

one or more bandpass filters located between the light source projector and the resin;

the gantry, which is moveable towards and away from the resin in a Z plane, and which is moveable in an X-Y plane for printing patterned layers; and wherein moving the light source towards and away from the resin along with moving the light source in the X-Y plane is configured to print different pixel sizes at different areas within a single layer of the layer-by-layer 3D printing process, such that a layer of the layers for the layer-by-layer 3D printing process is printed having different pixel sizes at different areas within the same layer.

2. The three-dimensional ("3D") printing system of claim 1, further comprising a linear activation mechanism for controlling the gantry, wherein the linear activation mechanism comprises at least one of a lead-screw, a stepper-motor, one or more linear rail, a linear rail, a nano-stage, or a single axis stage.

3. A three-dimensional ("3D") printing apparatus comprising:
   a build deck allowing for loading and unloading of a printing surface for 3D printing of an object or device;
   one or more clip located on a lateral side of the build deck, wherein the one or more clip has a bend providing a shelf for the printing surface, wherein the printing surface is secured in place between an upper surface of the one or more clip and a lower surface of the build deck, wherein the one or more clip has a thickness ranging from 0.15 mm to 0.5 mm;
   one or more spring for at least one of spring-activated locating of the printing surface, allowing for a repeatable location of the printing surface, spring-activated leveling of the build deck, spring-activated locking of the printing surface and the build deck, or spring-activated removal of the object or the device being 3D printed without having to remove the build deck; and
   one or more gantry located between an elevator and the build deck, wherein the one or more gantry has at least one axis of motion.

4. The three-dimensional ("3D") printing apparatus of claim 3, wherein the 3D printing apparatus prints the object or the device within a range of resolution between 0.2 um and 50 um.

5. A method of projector autofocus in three-dimensional printing providing for multiple pixel pitch and multiple mosaic layering, the method comprising:
   providing a projector comprising a projector lens, wherein the projector is attached to one or more Z axis gantry;
   automatically focusing of the projector lens for pixels between 0.1 um and 100 um;
   providing at least one of a stepper motor or a servo motor that interfaces with the one or more Z axis gantry;
   providing at least one of a bevel, a spur gears, set of screws, a hollow screw-set or a belt, or a linear activator, to activate the automatically focusing of the projector lens;
   using a linear rail to adjust a zoom of the projector lens;
   moving the projector as oriented relative to a vat window or a resin surface within a range between a first position wherein the projector lens is in contact with the bottom of the vat window or the resin surface and a second position 1 meter lower relative to the vat window or resin surface; and
   allowing for adjusting a position of the projector lens during operation of a three-dimensional printing process.

6. The method of claim 5, further comprising providing a computer processing unit, wherein the computer processing unit controls the location of the projector as oriented relative to the vat window or the resin surface within the range from the first position to the second position.

7. A shutter for a three-dimensional ("3D") printing apparatus, the 3D printing apparatus comprising the shutter, at least one filter, and a light source;
   wherein the shutter is located within the 3D printing apparatus, wherein the shutter is positionable between two or more positions, wherein the shutter is distance separated from the light source and operatively engaged with the at least one filter, and wherein the shutter is located between the light source and a polymerization vat;
   wherein a first position of the two or more positions of the shutter applies a filter of the at least one filter to the light source;
   wherein a second position of the two or more positions of the shutter applies a second filter of the at least one filter to the light source, or wherein the second position blocks the light source or allows light from the light source to freely pass; and
   wherein the shutter uses a first shutter position for a first exposure and uses a second shutter position for a second exposure, wherein the second exposure can be at least one of, the same as the first exposure, different than the first exposure, or polymerize the same or similar pixels or voxels as the first exposure.

8. A shutter for a three-dimensional ("3D") printing apparatus comprising at least one filter and a light source from a projector;
   wherein the shutter is located within the 3D printing apparatus, wherein the shutter has two or more positions, wherein the shutter is separate from the at least one filter and the light source, and wherein the shutter is positioned between the light source and a vat;
   wherein a first position of the two or more positions applies a filter to the light source;
   wherein a second position of the two or more positions applies a second filter to the light source, or wherein the second position blocks the light source or allows light from the light source to freely pass;
   wherein the shutter uses a first shutter position for a first exposure and uses a second shutter position for a second exposure, wherein the second exposure can be one of the same as the first exposure, different than the first exposure, or polymerize the same or similar pixels or voxels as the first exposure; and
   wherein a first position of the two or more positions apply a first filter during a first layer of 3D printing and a second position of the two or more positions applies a second filter during a second layer of 3D printing.

9. The shutter for a three-dimensional ("3D") printing apparatus of claim 7, wherein two positions of the two or more positions use two different filters for a same layer.

10. A shutter for a three-dimensional ("3D") printing apparatus comprising at least one filter and a light source from a projector;
   wherein the shutter is located within the 3D printing apparatus, wherein the shutter has two or more positions, wherein the shutter is separate from the at least one filter and the light source, and wherein the shutter is positioned between the light source and a vat;
   wherein a first position of the two or more positions applies a filter to the light source;
   wherein a second position of the two or more positions applies a second filter to the light source, or wherein the second position blocks the light source or allows light from the light source to freely pass;
   wherein the shutter uses a first shutter position for a first exposure and uses a second shutter position for a second exposure, wherein the second exposure can be one of the same as the first exposure, different than the first exposure, or polymerize the same or similar pixels or voxels as the first exposure; and wherein changing between the at least two or more positions causes a change in a surface roughness of an internal cavity of an object being 3D printed.

11. The shutter for a three-dimensional ("3D") printing apparatus of claim 7, further comprising a computer processor having a computer-aided design ("CAD") drawing setting, resin profile, or slicing setting, including a texture or roughness level, which selects the texture or roughness level and applies the texture or roughness level to internal surfaces of an object being 3D printed.

12. The shutter for a three-dimensional ("3D") printing apparatus of claim 7, wherein the shutter is servo-controlled.

13. The shutter for a three-dimensional ("3D") printing apparatus of claim 7, wherein the at least one filter comprises at least one of colored glass, a bandpass filter, or an optical filter.

* * * * *